(12) United States Patent
Cushman

(10) Patent No.: US 11,952,672 B2
(45) Date of Patent: Apr. 9, 2024

(54) SERIES OF CELLS FOR USE IN AN ELECTROCHEMICAL DEVICE

(71) Applicant: IFBattery Inc., West Lafayette, IN (US)

(72) Inventor: John H. Cushman, West Lafayette, IN (US)

(73) Assignee: IFBattery Inc., West Lafayette, IN (US)

( * ) Notice: Subject to any disclaimer, the term of this patent is extended or adjusted under 35 U.S.C. 154(b) by 0 days.

(21) Appl. No.: 17/275,218

(22) PCT Filed: Sep. 11, 2019

(86) PCT No.: PCT/US2019/050615
§ 371 (c)(1),
(2) Date: Mar. 11, 2021

(87) PCT Pub. No.: WO2020/056003
PCT Pub. Date: Mar. 19, 2020

(65) Prior Publication Data
US 2022/0042183 A1 Feb. 10, 2022

Related U.S. Application Data

(60) Provisional application No. 62/730,515, filed on Sep. 12, 2018, provisional application No. 62/733,202, (Continued)

(51) Int. Cl.
*C25B 9/70* (2021.01)
*C25B 1/04* (2021.01)
(Continued)

(52) U.S. Cl.
CPC .............. *C25B 9/70* (2021.01); *C25B 1/04* (2013.01); *C25B 9/66* (2021.01); *H01M 8/0206* (2013.01);
(Continued)

(58) Field of Classification Search
CPC .............. H01M 8/083; H01M 8/188; H01M 2300/0014; H01M 12/00–085;
(Continued)

(56) References Cited

U.S. PATENT DOCUMENTS 1,771,190 A 7/1930 Polcich
2,921,111 A 1/1960 Crowley et al.
(Continued)

FOREIGN PATENT DOCUMENTS

CH 245180 A 10/1946
CN 106159302 A 11/2016
(Continued)

OTHER PUBLICATIONS

Sequin, "Instantly rechargeable battery could change the future of electric and hybrid automobiles," at www.purdue.edu (Jun. 1, 2017).
(Continued)

*Primary Examiner* — James Lee
(74) *Attorney, Agent, or Firm* — Sonapat LLC

(57) ABSTRACT

A series of cells for use in an electrochemical device, such as an electrochemical cell or battery, that can operate in a single bulk electrolyte solution shared among the cells. Methods of producing hydrogen or both hydrogen and electricity in appreciable quantifies and in various ratios, and vehicles or other devices and applications powered by electrochemical devices comprising the series.

13 Claims, 15 Drawing Sheets

Related U.S. Application Data filed on Sep. 19, 2018, provisional application No. 62/801,919, filed on Feb. 6, 2019, provisional application No. 62/844,307, filed on May 7, 2019.

(51) Int. Cl.
  *C25B 9/65* (2021.01)
  *H01M 8/0206* (2016.01)
  *H01M 8/18* (2006.01)
  *H01M 8/2455* (2016.01)

(52) U.S. Cl.
  CPC ......... *H01M 8/188* (2013.01); *H01M 8/2455* (2013.01); *H01M 2300/0014* (2013.01)

(58) Field of Classification Search
  CPC ..... H01M 8/0206; H01M 8/2455; C25B 9/66; C25B 9/70; C25B 1/04
  See application file for complete search history.

(56) References Cited

U.S. PATENT DOCUMENTS

| | | | |
|---|---|---|---|
| 3,156,586 A | 11/1964 | Solomon et al. | |
| 3,378,408 A | 4/1968 | Hamlen et al. | |
| 4,037,025 A | 7/1977 | Dey et al. | |
| 4,355,085 A | 10/1982 | Goebel | |
| 4,517,736 A | 5/1985 | Goebel | |
| 4,988,585 A | 1/1991 | O'Hara et al. | |
| 5,286,473 A | 2/1994 | Hasebe et al. | |
| 6,506,360 B1 | 1/2003 | Andersen et al. | |
| 7,255,960 B1 * | 8/2007 | Dow ..................... | H01M 6/32 429/105 |
| 10,665,868 B2 | 5/2020 | Cushman et al. | |
| 11,894,591 B2 | 2/2024 | Cushman | |
| 2001/0028979 A1 | 10/2001 | Takami | |
| 2002/0110733 A1 | 8/2002 | Johnson | |
| 2003/0042872 A1 | 3/2003 | Larson | |
| 2009/0159582 A1 | 6/2009 | Chami et al. | |
| 2011/0091776 A1 | 4/2011 | Rubino et al. | |
| 2011/0311846 A1 | 12/2011 | Whitacre | |
| 2013/0089769 A1 | 4/2013 | Proctor et al. | |
| 2013/0309554 A1 | 11/2013 | Dhar et al. | |
| 2013/0323565 A1 | 12/2013 | Tucholski | |
| 2014/0093804 A1 | 4/2014 | Kreiner et al. | |
| 2014/0272483 A1 | 9/2014 | Pham et al. | |
| 2015/0086843 A1 | 3/2015 | Whitacre | |
| 2015/0118583 A1 | 4/2015 | Arbel et al. | |
| 2016/0285130 A1 | 9/2016 | Meng et al. | |
| 2019/0296383 A1 | 9/2019 | Cushman | |
| 2021/0013531 A1 | 1/2021 | Cushman et al. | |
| 2023/0076928 A1 | 3/2023 | Cushman | |
| 2023/0275332 A1 | 8/2023 | Cushman et al. | |
| 2023/0343945 A1 | 10/2023 | Nauman et al. | |

FOREIGN PATENT DOCUMENTS

| | | |
|---|---|---|
| GB | 1204830 | 9/1970 |
| GB | 1579747 | 11/1980 |
| WO | WO2017106215 A1 | 6/2017 |
| WO | WO2018169855 A1 | 9/2018 |
| WO | WO2022031900 A1 | 2/2022 |
| WO | WO2022076672 A1 | 4/2022 |

OTHER PUBLICATIONS

International Search Report for international patent application PCT/2018/021981, dated Jul. 24, 2018.

Written Opinion of the International Searching Authority for international patent application PCT/2018/021981, dated Jul. 24, 2018.

Purdue University Research Foundation News, "Refillable technology could provide enough energy to drive an electric car up to 3,000 miles," at https://www.purdue.edu/newsroom/releases/2019/Q1/refillable-technology-could-provide-enough-energy-to-drive-an-electric-car-up-to-3,000-miles.html (Feb. 7, 2019) (7 pages) with transcript of video (3 pages).

International Search Report for international patent application PCT/2019/050615, dated Jul. 27, 2020.

Written Opinion of the International Searching Authority for international patent application PCT/20191050515, dated Jul. 27, 2020

Machine Translation of CH245180A (4 pages).

Machine Translation of CN106159302A (10 pages).

Macdonald et al., "Evaluation of Alloy Anodes for Aluminum-Air Batteries: Corrosion Studies," Corrosion Science, vol. 4, pp. 652-657 (1988).

Notice of Allowance dated Dec. 1, 2023, for U.S. Appl. No. 17/887,590 (12 pages).

* cited by examiner

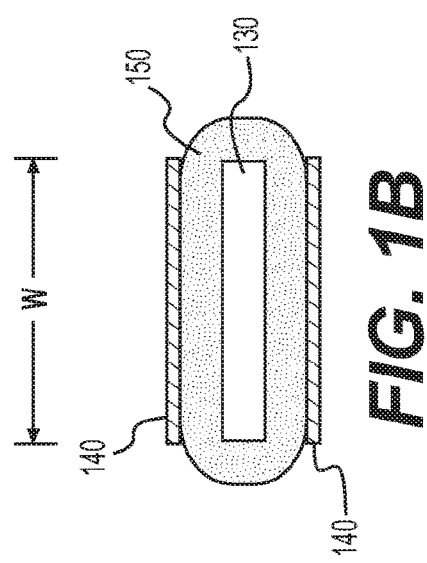
FIG. 1B
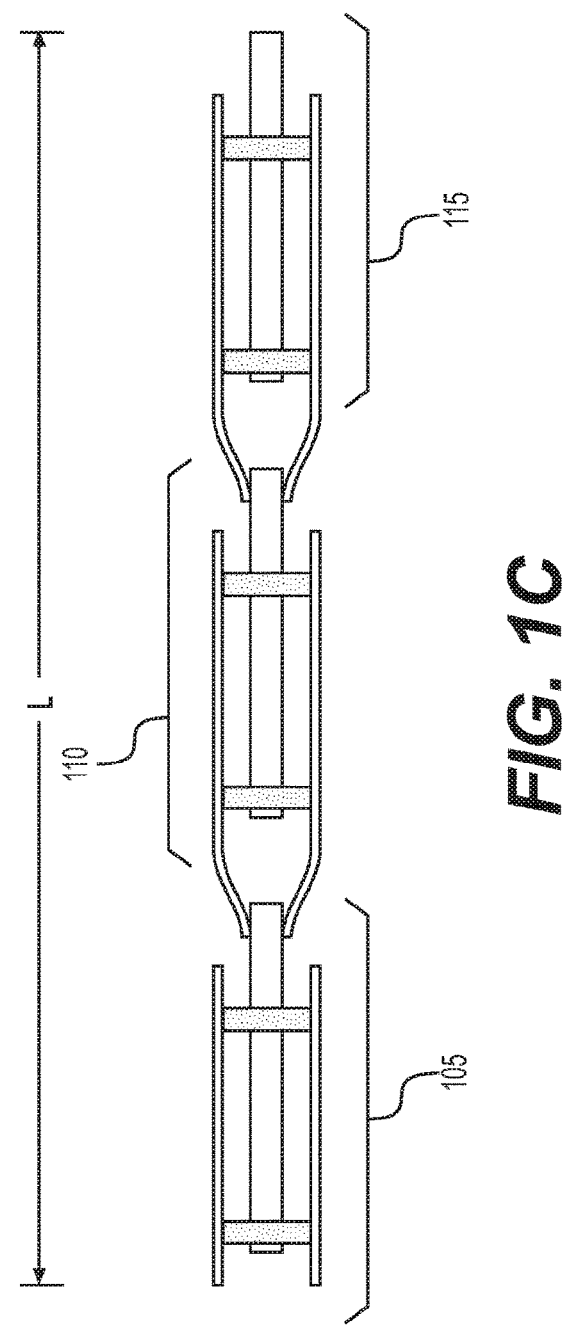
FIG. 1C
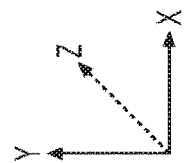

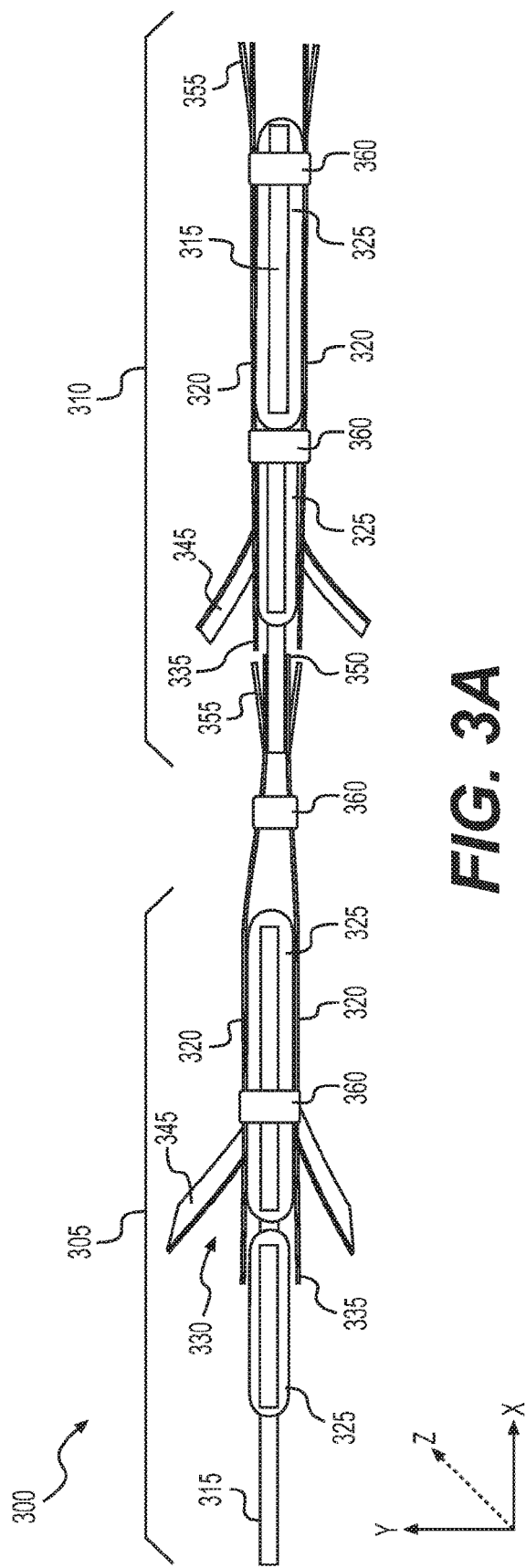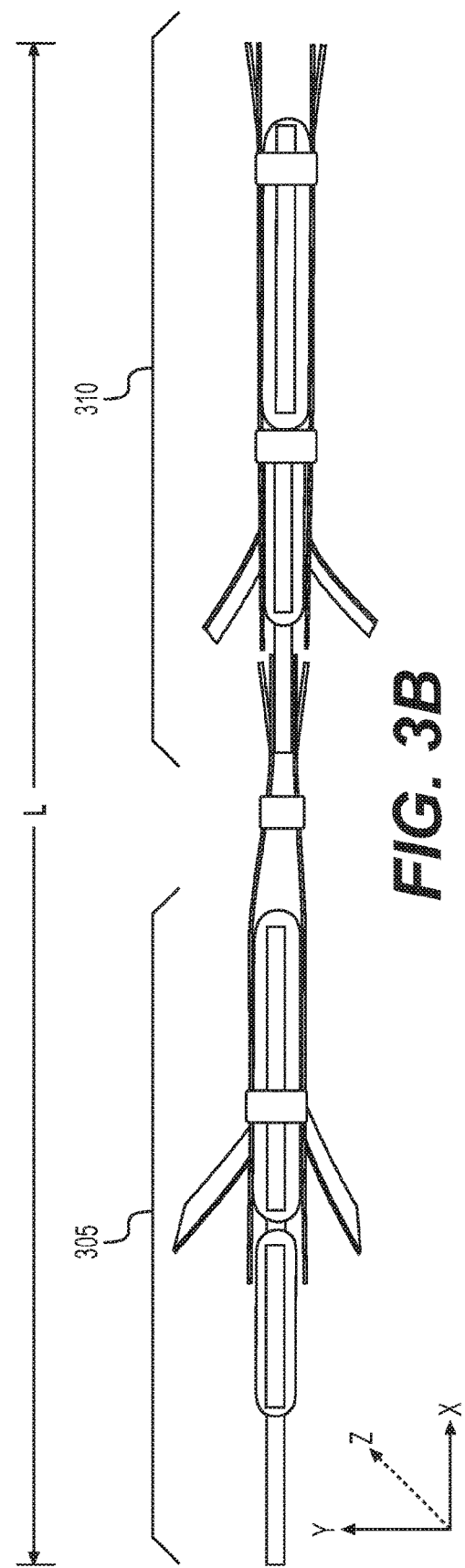

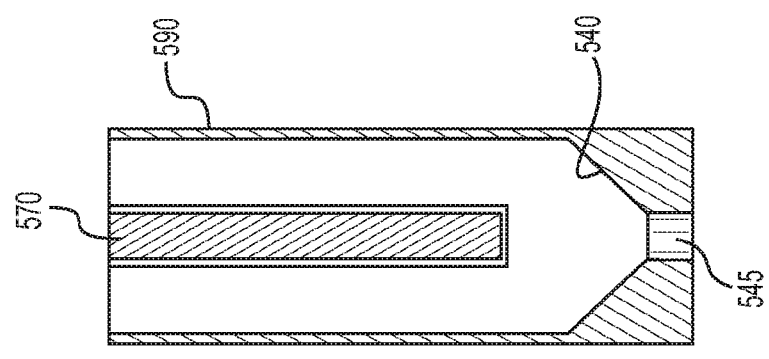

SERIES OF CELLS FOR USE IN AN ELECTROCHEMICAL DEVICE

CROSS-REFERENCE TO RELATED APPLICATIONS

This application claims priority to, and benefit of, U.S. provisional application No. 62/730,515, filed on Sep. 12, 2018, U.S. provisional application No. 62/733,202, filed on Sep. 19, 2018, U.S. provisional application No. 62/801,919, filed on Feb. 6, 2019, and U.S. provisional application No. 62/844,307, filed on May 7, 2019, the entire contents of all of which are specifically incorporated by reference herein.

BACKGROUND

Conventional liquid batteries comprise electrochemical cells that employ reduction-oxidation chemistry. Oxidation occurs on the anode side of the cell and reduction on the cathode side. Each half cell includes an electrode (i.e. cathode on the cathode side and anode on the anode side) and its own electrolyte. Each of the two electrolytes is often in the form of an aqueous solution. The electrodes of the two half cells can be placed in electrical contact to allow for current to flow. To maintain charge balance, an electrochemical cell allows for the exchange of ions between the electrolytes. In some batteries, this is done through a salt bridge, membrane, or other material or technique that separates the cathode electrolyte solution from the anode electrolyte solution and prevents them from mixing. Conventional thought is that if the solutions were to mix, the half-cells would be destroyed by direct chemical reaction.

Some electrochemical cells deploy membranes or salt bridges to separate multiple electrolyte solutions and prevent shorting. Such membranes are costly and readily degrade over time. WO 2017/106215 reports electrochemical cells that use two or more immiscible electrolytes for use in the absence of membranes. WO 2018/169855 of IFBattery Inc. discloses additional electrochemical cells.

SUMMARY

The present disclosure includes a series of cells for use in an electrochemical device, such as for use in electrochemical cells and in batteries. One embodiment of the disclosure is a series of cells that comprises:
  a first cell comprising an anode and a cathode current collector; and
  a second cell comprising an anode and a cathode current collector;
  wherein the cathode current collector of the first cell is in physical contact with the anode of the second cell.

This arrangement of cells differs from classical batteries arranged in series. A series of classical batteries includes multiple individual batteries connected to each other with conductive wire, where each battery includes two half cells and each half cell contains its own electrolyte. The series arrangement of the disclosure includes cells physically connected anode-to-cathode current collector. When exposed to electrolyte, the anode and cathode current collector in each cell share a single electrolyte solution, as opposed to requiring two electrolyte solutions partitioned between half cells. The series of cells of the disclosure can also be embedded within a single bulk electrolyte solution common to all cells, as opposed to a classical series where the batteries do not share electrolyte solutions.

The series of cells of the disclosure can operate as flow cells such as in a flow battery, with electrolyte flowing, for example, between the anodes and cathode current collectors of the cells. In some embodiments, at least one cell in the series comprises a convergent nozzle that can assist in directing flow of electrolyte solution from one cell to another cell along the length of the series. Other embodiments include flowing electrolyte in a direction transverse to the cells, such as between the anode and cathode current collectors in a direction across the width of the cells, or flowing electrolyte in a direction normal to the plane of sheets of anodes and cathode current collectors in the cells.

Additional embodiments include methods of producing electricity or hydrogen with electrochemical devices comprising the series of cells. The electrochemical devices can be configured to produce hydrogen or a combination of both hydrogen and electricity in appreciable amounts and in various ratios. Further embodiments include vehicles and other devices and applications powered by electrochemical devices such as batteries that comprise the series of cells.

More embodiments and features are included in the detailed description that follows, and will be readily apparent to those skilled in the art from the description or recognized by practicing the embodiments as described in the description, including in the figures and claims.

BRIEF DESCRIPTION OF THE DRAWINGS

The accompanying figures constitute a part of this disclosure. The figures serve to provide a further understanding of certain exemplary embodiments. The disclosure and claims are not limited to embodiments illustrated in the figures.

FIG. 1B is a sectional view of the series of cells shown in FIG. 1A.

FIG. 1C is the series of cells shown in FIG. 1A together with an illustration of the length of the series.

FIG. 3A is a side view of a series of two cells of the disclosure, where each cell comprises a convergent nozzle.

FIG. 3B shows the series of cells of FIG. 3A together with an illustration of the length of the series.

FIG. 5C is a sectional view of the caddy shown in FIG. 5B.

DETAILED DESCRIPTION

Various additional embodiments of the disclosure will now be explained in greater detail. Both the foregoing general description and the following detailed description are exemplary and explanatory only, and are not restrictive of this disclosure or of the claims. Any discussion of certain embodiments or features, including those depicted in the figures, serve to illustrate certain exemplary aspects of the disclosure. The disclosure and claims are not limited to the embodiments specifically discussed herein or illustrated in the figures.

An embodiment of the disclosure includes a series of cells for use in an electrochemical device, which comprises:
  a first cell comprising an anode and a cathode current collector; and
  a second cell comprising an anode and a cathode current collector;
  wherein the cathode current collector of the first cell is in physical contact with the anode of the second cell.

Figure 3C:
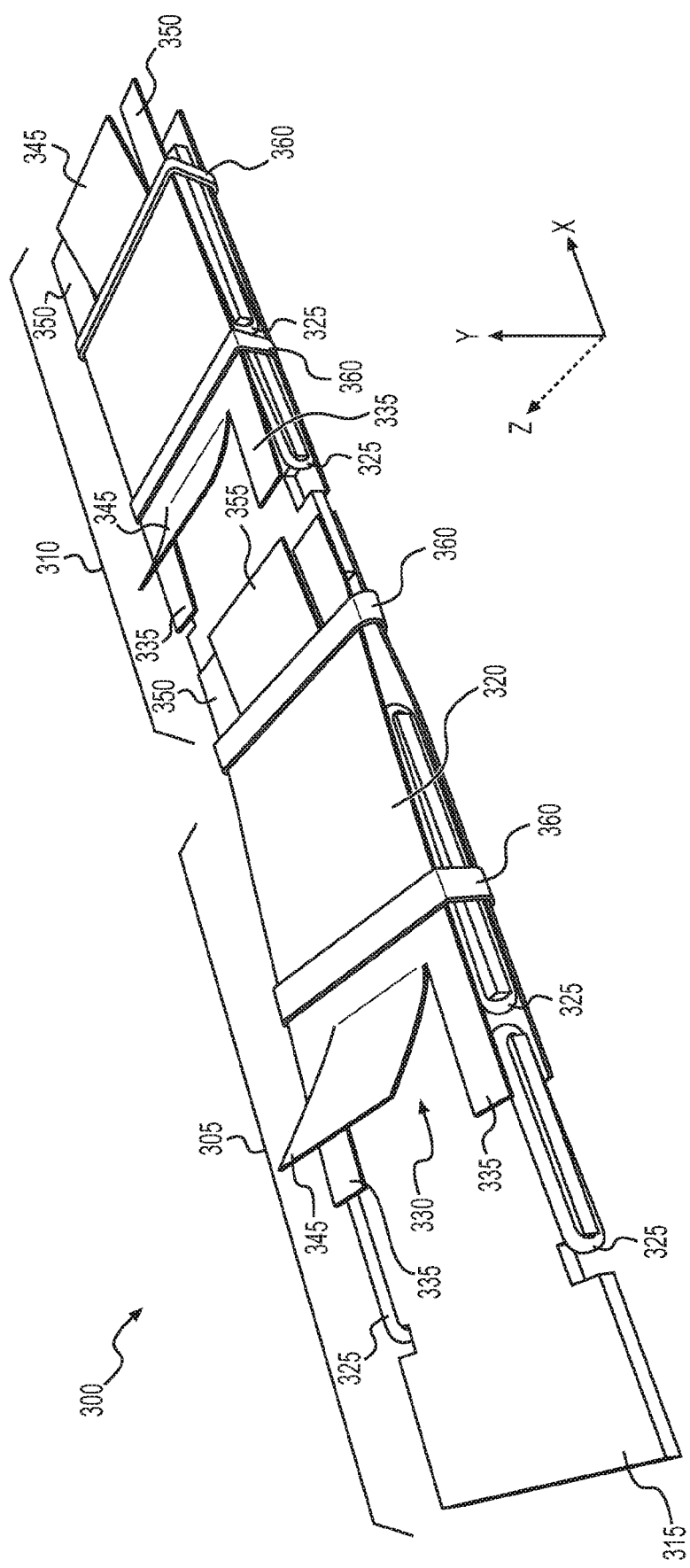
FIG. 3C is a perspective view of the series of two cells shown in FIG. 3A.

Reference to a "first" cell and a "second" cell does not limit the series to only two cells. The series may comprise one or more cells in addition to the "first" and "second" cells. In some embodiments, the series comprises N cells, each cell comprising an anode and a cathode current collector, wherein N−1 cells in the series comprise a cathode current collector that is in physical contact with the anode of an adjacent cell in the series, and wherein N is an integer greater than 2. N−1 cells in the series comprise a cathode current collector that is in contact with the anode of an adjacent cell when the series terminates with a cell, such as cell 105 shown in FIG. 1A and cell 310 shown in FIG. 3A, that may connect through its cathode current collector to a load.

In some embodiments, the series of cells of the disclosure comprises 3 or more cells, 6 or more cells, 9 or more cells, 10 or more cells, 12 or more cells, 15 or more cells, 20 or more cells, 30 or more cells, 40 or more cells or 50 or more cells. For example, the series may comprise 2, 3, 4, 5, 6, 7, 8, 9, 10, 11, 12, 13, 14, 15, 16, 17, 18, 19, 20, 25, 30, 35, 40, 45, 50 or more cells. In other embodiments, the series has exactly 2, 3, 4, 5, 6, 7, 8, 9, 10, 11, 12, 13, 14, 15, 16, 17, 18, 19, 20, 25, 30, 35, 40, 45 or 50 cells, such as exactly 6, 7, 8, 9, 10, 11 or 12 cells, or such as exactly 9 cells.

The anode and cathode current collector within each individual cell of the series are positioned at a distance from each other. All references in this disclosure to an anode and a cathode current collector within the same cell implicitly include those components positioned at a distance from each other. This prevents physical contact between the anode and cathode current collector within the same cell, ensuring that a common fluid in contact with each would not cause a short. The distance between the two can also serve as a conduit for flow of electrolyte solution. At least one cell in the series may comprise a non-conductive spacer between its anode and cathode current collector that could maintain the distance between those components. The phrase "at least one cell" in this context and other contexts includes the possibility of more than one or all cells in the series comprising a non-conductive spacer between their respective anodes and cathode current collectors. One or all of these non-conductive spacers may contact both the anode and cathode current collector of the cell. Alternatively, one or all of the spacers may contact only the anode or only the cathode current collector.

The term "non-conductive" with reference to the spacer means that the spacer is not electrically conductive. Non-conductive materials include those that are classified as electrical insulators. Thus, any electrical insulator can be used as a spacer. Example non-conductive materials include non-conductive polymers and plastics, glass, paper or cardboard, wood, clay, mica, rubber and Teflon. The thickness of the spacers can be of any appropriate dimension, such as from about 0.1 mm to about 10.0 mm, including about from about 0.1 mm to about 5 mm such as about 0.8 mm or about 2.5 mm. Any appropriate technique other than the use of a spacer could also be used to maintain a distance between the anode and cathode current collector within an individual cell.

The phrase "physical contact," when used in the context of a cathode current collector of one cell being in physical contact with an anode of another cell, means at least some portion of the cathode current collector physically touches at least some portion of the anode of the other cell, i.e., there is no intervening space or material between the portions being contacted. Any appropriate technique can be used to maintain physical contact between the two, such as the use of a clamp or other device that compresses the two together.

The cathode current collector of at least one cell can be in the form of a single piece of material, such as a sheet. The cathode current collector of at least one cell could alternatively be in the form of multiple pieces of material, such as multiple sheets. The phrase "at least one cell" in these contexts and other contexts includes the possibility of more than one or all cells in the series comprising a cathode current collector in the form of a single piece of material, or multiple pieces of material, respectively.

When the cathode current collector of a cell is in the form of multiple pieces of material, such as multiple sheets, each piece of material is positioned at a distance from the anode in the same cell. For example, each piece of cathode current collector may be maintained at a distance from the anode in the same cell by a non-conductive spacer disposed between the two. The multiple pieces of cathode current collector material may either share a common spacer or alternatively may be maintained at a distance from the anode by different spacers. Additionally, the multiple pieces of cathode current collector material could each physically contact the anode of an adjacent cell in the series.

Accordingly, an additional embodiment of the disclosure includes a cell comprising an anode; a first piece of cathode current collector material and a second piece of cathode current collector material each positioned at a distance from the anode; and which optionally comprises a non-conductive spacer between each of the pieces of cathode current collector material and the anode of the cell. This cell may comprise one or more pieces of additional cathode current collector material positioned at a distance from the anode, optionally with a non-conductive spacer between each of the one or more additional pieces of cathode current collector material and the anode. This cell can be included, for example, within a series of cells according to the disclosure, such as illustrated by cells 110 and 115 in FIG. 1A.

Figure 1A:
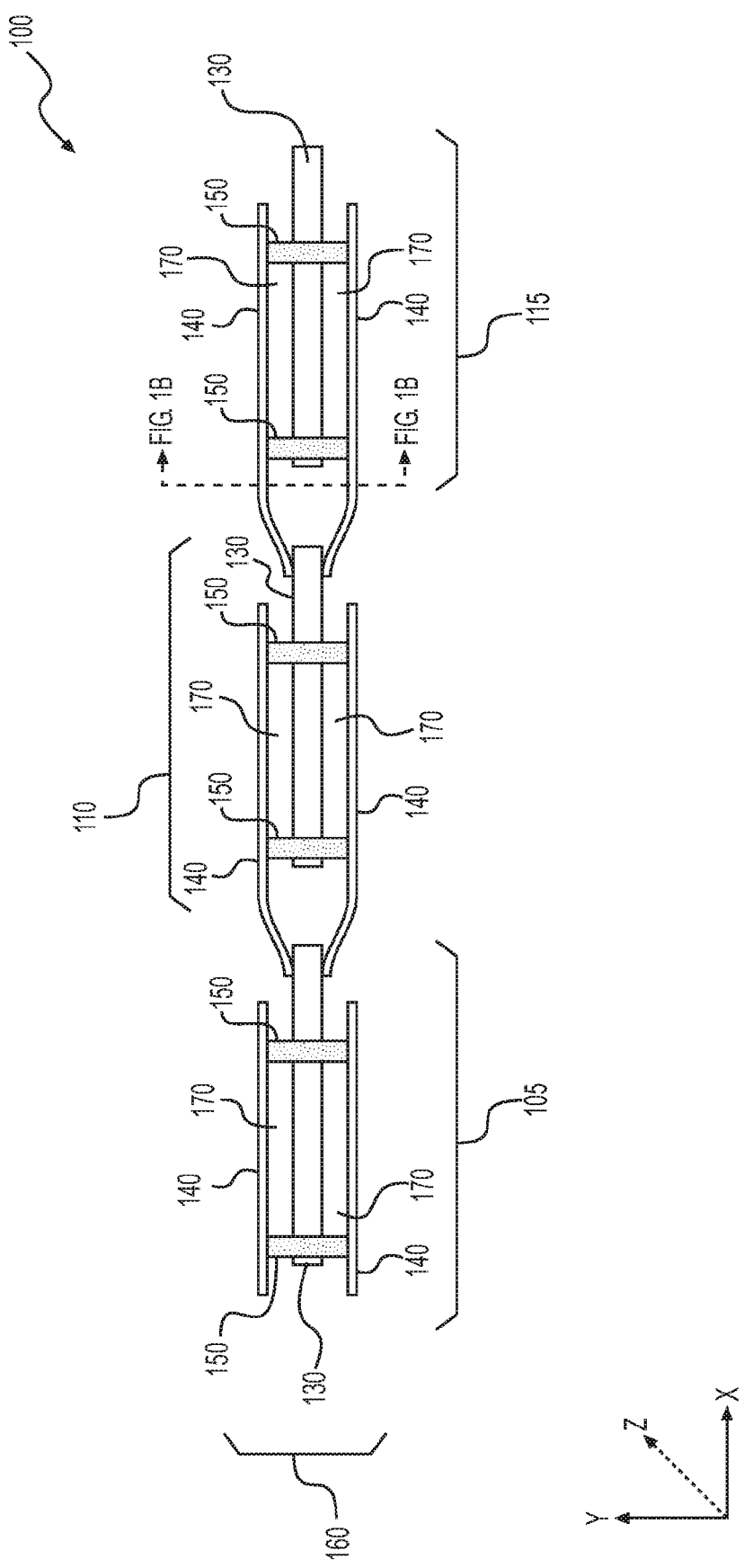
FIG. 1A shows a series of three cells of the disclosure.

FIG. 1A illustrates one embodiment of a series of cells of the disclosure. The figure shows series 100 of three cells 105, 110 and 115. Each cell contains an anode 130, shown here in the form of a sheet. Cathode current collector 140 (in the form of multiple sheets) of cell 115 is in physical contact with the anode 130 of adjacent cell 110, and cathode current collector 140 of cell 110 is in physical contact with the anode 130 of adjacent cell 105. Cell 105 at the terminal end of the series does not comprise a cathode current collector in physical contact with the anode of an adjacent cell.

Anodes 130 and cathode current collectors 140 are maintained at a distance from each other by non-conductive spacers 150 disposed between the two, shown here as rubber O-rings wrapped width-wise around the anodes 130, with the width extending in the z-direction of the coordinates provided. FIG. 1B provides a sectional view illustrating this, where the two pieces of cathode current collector 140 share the same O-ring 150 as a common spacer on opposing sides of anode 130. The spacers 150 in this embodiment also form conduits 170 in each cell through which an electrolyte solution may flow between the anode and cathode current collector. The electrolyte solution may flow, for example, transverse to one or more cells in the series, with the flow directed at least partly or completely in the z-direction across the width of the cells. FIG. 1B illustrates the width W of the cells in the z-direction, while FIG. 1C illustrates the length L of the series in the x-direction. Alternatively, electrolyte could flow in a direction at least partly or completely normal to the sheets of anode and cathode current collector, in the y-direction, if one or both are porous to the electrolyte. Each vertical stack 160 of anode 130, cathode current collector 140 and spacer 150 could optionally be wrapped in a material such as surgical tape so as to maintain physical integrity of the stack. A clamp could alternatively be used in place of a wrapping. A wrapping of surgical tape or a clamp or other form of compression around stack 160 can serve as a compress to keep the assembly from separating and prevent movement of the components relative to each other. The wrapping or clamp need not completely encase the cell.

Figure 2:
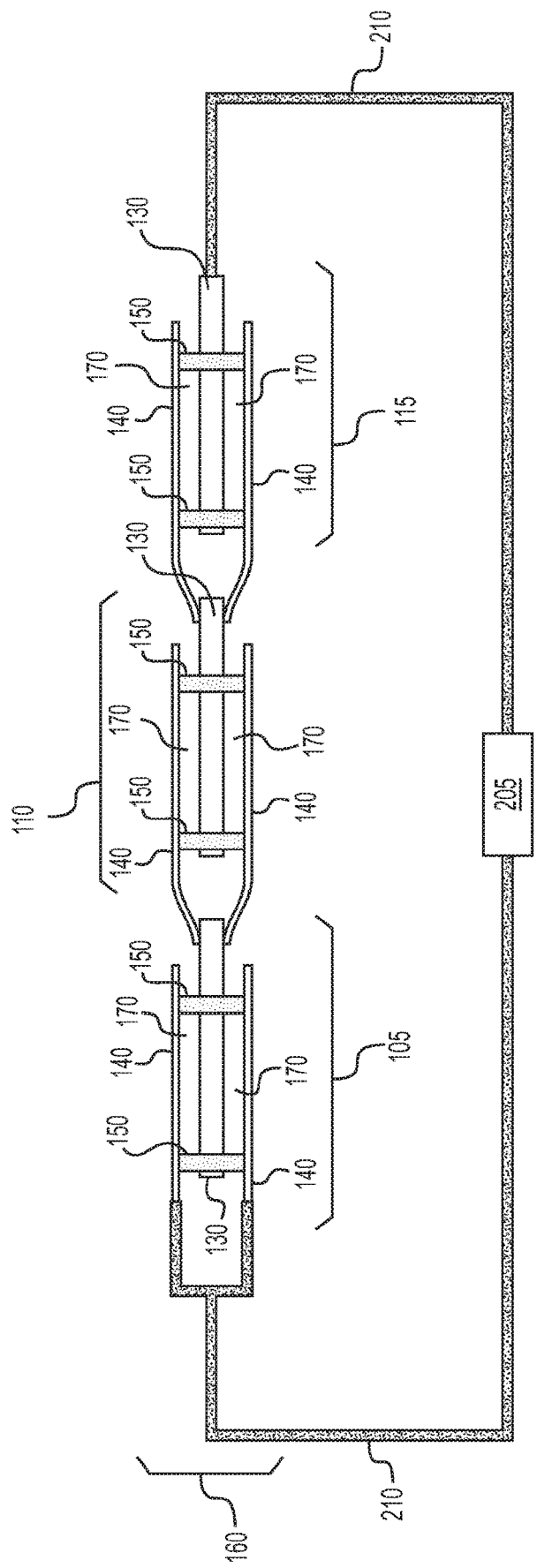
FIG. 2 shows the series of three cells of FIG. 1 connected to a load.

The series of cells illustrated in FIG. 1A could connect as shown in FIG. 2 to a load 205 via a conductor 210, such as copper wire. Such a cell in the presence of an electrolyte solution as described herein can generate electrical current.

The anodes and cathode current collectors in the series of cells of the disclosure may have any appropriate shape. In some embodiments, at least one anode and/or at least one cathode current collector (or multiple pieces of cathode current collector material) is in the form of a sheet or screen, such as a rectangular sheet, or in the form of a rectangular block. The phrase "at least one anode and/or at least one cathode current collector" in this context includes the possibility of all cells in the series comprising anodes and/or cathode current collectors (or multiple pieces of cathode current collector material) in the form of sheets. A sheet is typically flat with opposing top and bottom sides. Sheets of either material could also include a portion that is not flat, such as portions of cathode current collectors 140 shown in FIG. 1A, where portions of the cathode current collector bend to contact the anode of an adjacent cell. The thickness of sheets of anodes or cathode current collectors can range, for example, from about 0.05 mm to 0.5 mm, or from about 0.1 mm to about 0.3 mm. In some embodiments, the thickness of the anode is greater than that of the cathode current collector. For example, in some embodiments the anode may have a thickness of from about 1 mm to about 25.4 mm, including from about 1 mm to 5 mm (such as about 3.4 mm), while the cathode current collector in the same cell can have, for example, a thickness of from about 0.05 mm to 0.5 mm (such as about 0.28 mm).

In the case of a cell that comprises multiple pieces of cathode current collector material, a first piece of cathode current collector material may, for example, be positioned at one side of an anode sheet, separated from the anode by a non-conductive spacer, and a second cathode current collector piece may, for example, be positioned at an opposing side of the anode sheet, separated from the anode by a non-conductive spacer. This is illustrated in cells 105, 110 and 115 in FIG. 1A.

Anodes and cathode current collectors in this disclosure may be constructed from any suitable materials. The series may comprise cells having anodes all constructed of same material, or the anodes in some cells could be made from a material different from that of anodes in other cells of the series. In some embodiments, one or more or all anodes in the series comprise a metal selected from Column 13 of the Periodic Table either alone or in any alloy, or they may consist of an alloy made from two or more of these metals.

In some embodiments, at least one or all anodes of the cells in the series may comprise at least one of aluminum, gallium, indium, and thallium, or any combination of two or more of these. One example alloy has the name of Galinstan, which is an alloy of gallium, indium and tin. Embodiments of the disclosure also include a series where all anodes consist of aluminum, gallium, indium or thallium, or any combinations thereof.

The series may also comprise cells having cathode current collectors each made of the same or different materials. In some embodiments, at least one or all cathode current collectors of the cells in the series comprise at least one of bronze, phosphor bronze (which offers improved degradation resistance compared to carbon), steel, carbon, the graphite allotrope of carbon, carbon impregnated with a metal, carbon foam, copper, tin, iron, lead, platinum, gold, and silver, or any combination of two or more of these. Embodiments of the disclosure also include a series where all cathode current collectors consist of bronze, phosphor bronze, steel, carbon, the graphite allotrope of carbon, carbon impregnated with a metal, carbon foam, copper, tin, iron, lead, platinum, gold, silver, or any combinations thereof.

In some embodiments, a non-conductive spacer in one or all cells of the series is porous. In this context, a "porous" non-conductive spacer is porous to electrolyte, and is also porous in a non-selective manner to anions and cations in an electrolyte solution contacting the cell. Examples of porous, non-conductive spacers include porous glass, papers, fabrics, cloth, wood, organic polymer (such as vinyl coated polyester), fiberglass film, glass wool, cardboard, nylon, and combinations of two or more of these. Embodiments of the disclosure include porous non-conductive spacers in the cells that consist of any of these examples or combinations thereof.

In some embodiments, the porous spacer can occupy all or a substantial amount of distance or volume between the anode and cathode current collector of a cell. In such an embodiment, an electrolyte solution could flow in a tortuous path through the porous material. In other embodiments, the porous spacer does not occupy all or a substantial amount of distance or volume between the anode and cathode current collector. In that embodiment, an electrolyte solution could flow both through and around the porous spacer.

In other embodiments, a non-conductive spacer in one or all cells of the series is non-porous. Examples of non-porous, non-conductive spacers include non-porous plastics, elastomers, organic polymers, gels, rubbers, O-rings, and combinations of two or more of these. Embodiments of the disclosure include non-porous non-conductive spacers in the cells that consist of any of these examples or combinations thereof. Such materials can, for example, separate the cathode current collector and anode of the same cell such that a conduit is formed between the two that can be occupied by an electrolyte solution. These spacers can also form boundaries that assist in directing flow of electrolyte along the conduits between the anodes and cathode current collectors. For example, FIG. 3A shows O-rings 325 forming boundaries length-wise (in the x-direction shown) that assist in directing flow along the length of the series. FIG. 3B illustrates the length L of the series.

In some embodiments, the series of cells does not comprise, and is not contacted with, an electrolyte solution. Such embodiments may, for example, be constructed in one location then transported to another location where they are contacted with electrolyte solution for use.

Other embodiments include providing a series of cells of the disclosure and contacting the series with a single electrolyte solution. The phrase "contacting the series" involves contacting the anodes and cathode current collectors of the cells in the series with the solution. The term "single electrolyte solution" refers to a bulk volume of one common electrolyte solution shared between the cells of the series. This contrasts with a classical series of batteries where each battery contains its own electrolyte solutions not shared in common with other batteries in the series. Sharing the single electrolyte solution among the cells also includes sharing the single electrolyte solution between the anode and cathode current collector within each individual cell in the series. This contrasts with conventional liquid batteries, which require at least two electrolyte solutions, i.e., an electrolyte solution for each of the half cells. The single electrolyte solution may comprise any appropriate number of components as described herein, including multiple components that could be considered electrolytes components.

The series of cells may be contacted with a single electrolyte solution such as when in use or in preparation for use. Contacting the series with electrolyte solution could include placing the series in an electrolyte bath of the solution. The series of cells can be completely or partially immersed or submerged within the single electrolyte solution. The solution may also be sprayed on the cells or delivered by atomization, such as when the anode, cathode current collector, or spacer(s) are porous. A solution may also be directed to flow through or over the series of cells or to contact the series of cells in any other way. An example of flowing the electrolyte through the cells is by flowing the electrolyte through conduits between the anodes and cathode current collectors of the cells.

In some embodiments, the cells in the series are configured to operate as flow cells. The cells may be configured as flow cells so as to support a flow battery, for example. In flow mode, electrolyte solution flows through the cells during their operation and electrical charging is not required. The electrolyte solution could be stored outside of the cells then directed to flow through the cells. Spent electrolyte can be recovered as additional electrolyte is provided to the cells.

A further embodiment therefore includes a method of operating a series of cells of the disclosure in flow mode, that comprises 1) providing a series of the cells of the disclosure, 2) contacting the series of cells with a single electrolyte solution, 3) operating the cells to produce hydrogen, or both hydrogen and electricity, and 4) providing additional electrolyte solution (or one or more components thereof) to the series during its operation. Such an embodiment can further comprise 5) withdrawing spent electrolyte solution (or one or more components thereof) from the electrolyte solution during operation, for example, simultaneously with providing additional electrolyte solution (or one or more components thereof) to the series. Electrolyte solution (or one or more components thereof) may be provided or withdrawn on a continuous basis. A recirculator could be used to continuously recycle and deliver electrolyte or other materials to the series of cells, optionally supplementing the electrolyte solution to maintain concentrations of components being spent. Thus, it is not necessary to keep a large supply of aqueous electrolyte present, which saves on both cost and weight compared with traditional flow cells.

A further embodiment comprises providing a series of the disclosure, such as but not limited to a linear series, wherein one or more or all cells in the series comprises a conduit between its anode and cathode current collector (with or without a spacer disposed between them), wherein the conduit extends from an inlet end to an outlet end of the conduit; and providing a flow of a single electrolyte solution through the conduits of the cells in the series.

A series of cells of the disclosure can in some embodiments be linear, meaning that the cells are positioned such that the series is linear along its length from one end of the series to the other end of the series. The term "linear" in this context does not require a perfectly linear arrangement of cells and includes, for example a generally straight string of cells permitting some variation especially when not using visual or mechanical guides to position the cells. FIGS. 1A and 3A illustrate a linear series of three and two cells, respectively. The series of cells of the disclosure could also be arranged in any other orientation that is not linear, such as in circular or semi-circular arrangements, U-shapes, zig-zags, or combinations thereof. The cells in the series could be oriented to form any number of curves and angles along the length of the series.

The length of the series begins at one end of the series, extends through the cells in the series, and ends at the other end of the series. The series length is the sum total of the lengths of each of the cells in the series. FIG. 1C illustrates the length L of the series extending from cell 105 to cell 115 along the positive x-direction illustrated by the coordinates shown. A direction transverse to a cell in the series extends in the positive z-direction of the coordinates across the width of the cell, which is perpendicular to the lengths of the cells that extend in the x-direction. If the series was instead oriented to form a curve, a direction transverse to a cell in the series would extend in a direction perpendicular to the tangent of such a curve. A direction normal to the plane of the anode and cathode current collector sheets in FIG. 1C extends in the y-direction of those coordinates. FIG. 3B similarly illustrates the length L of the series extending from cell 305 to 310 along the positive x-direction.

The distance between the anode and cathode current collector within each cell can form a conduit through which electrolyte may flow, either with or without the presence of a spacer between the two. In some embodiments, such a conduit in the cells extends in a direction along the length of the series of cells of the disclosure. For example, FIGS. 3A and 3B illustrate a series 300 of two cells 305 and 310. The cells in the series each comprise anodes 315 and cathode current collectors 320, with the cathode current collectors in the form of two pieces of material on opposing sides of the anodes. The anodes 315 and cathode current collectors 320 are positioned at a distance from each other. O-rings 325 on each side of anodes 315 act as spacers to maintain the distance between the anode and current collector within each individual cell, and also to form a conduit 330 for electrolyte flow between the anode and cathode current collectors of the cells.

Conduit 330 between anode 315 and cathode current collector 320 on the top side of the cell extends in a direction along the length of the series. A similar conduit between the anode and cathode current collector on the bottom side of the cell extends in the same direction. The series of cells may further comprise a convergent nozzle (shown here as formed by flap 345) in one or more or all cells in the series. The term "convergent nozzle" refers to a structure that reduces the cross-sectional area of the conduit (in the yz-plane shown in FIG. 3A) in the direction from the conduit's inlet end to its outlet end. In the embodiment shown, flap 345 is formed as the result of a bend in the cathode current collector and forms the convergent nozzle. Any reference herein to a cathode current collector forming a convergent nozzle includes the cathode current collector either wholly forming a convergent nozzle, or, at least partially forming the convergent nozzle together with any other components. The conduit extends from the left edge of flap 345 (inlet) to flap 355 (outlet) from left to right in the positive x-direction. The series in FIGS. 3A and 3C comprises convergent nozzles formed from the cathode current collector, positioned both at the top and bottom sides of the cell. Flap 345 is configured at an angle relative to the anode 315 in cell 305. Tabs 335 on each side of flap 345 in this embodiment remain flat. The distance between at least a portion of the cathode current collector and the anode tapers to reduce the cross-sectional area of the conduit (here in the yz-plane) in the direction of flow through the cell in the positive x-direction. Tabs 350 of the cathode current collector of cell 305, at the outlet of the conduit, are in physical contact with the anode of adjacent cell 310. Tabs 350 could be pressed against the anode to maintain physical contact, for example, using a clamp or other appropriate form of compression. Flap 355 at the outlet of the conduit and between tabs 350 may be angled slightly to accommodate outgoing flow of electrolyte. A material 360 such as surgical tape wraps around the width of the cells to compress the components of each cell.

When the conduit in each cell in the series extends along the length of the series, the electrolyte can flow from one end of the series and through the cells to the other end of the series. Such a method includes flowing electrolyte in the positive x-direction in FIG. 3A.

A further apparatus of the disclosure can facilitate the flow of electrolyte through one end of the series to the other end of the series. The apparatus comprises a housing comprising at least one channel extending from one outer surface of the housing to an opposing outer surface of the housing; and a series of cells of the disclosure positioned within the at least one channel. The housing can be in the form of an elongated body, for example, with a channel extending along the length of the elongated body from one end to the other and suited to accommodate placement of the series. In some embodiments, the housing is cylindrical or rectangular in shape and the channel, which may also be rectangular in cross-section, extends from one end of the housing to the other end of the housing. As with the series of cells of the disclosure, the channel may be linear or may have any other shape appropriate for housing the series of cells.

Figure 4A:
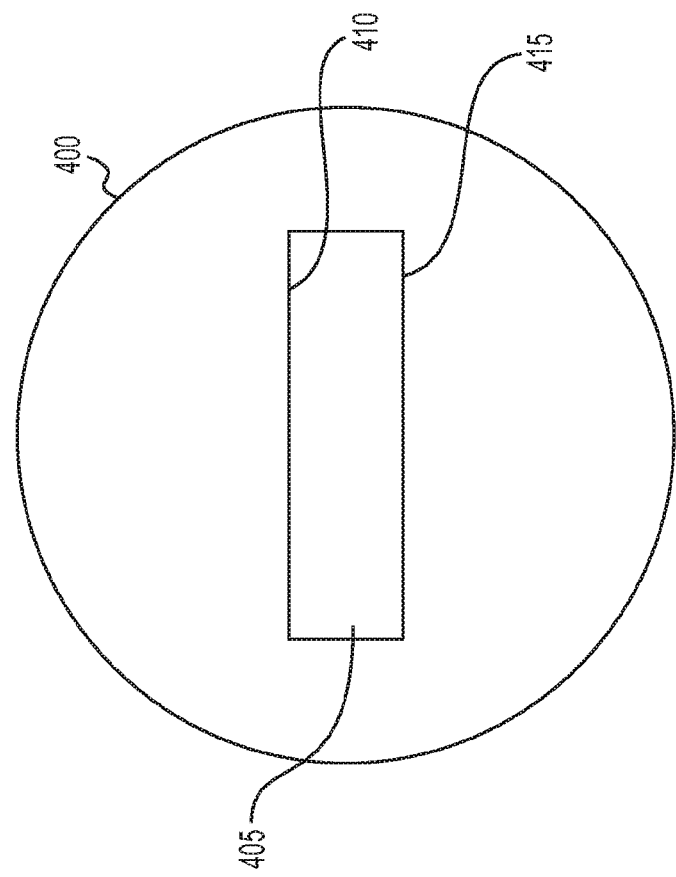
FIG. 4A is a cross-sectional view of a housing in the form of a tube, with a rectangular channel extending through the tube in the z-direction.
Figure 4A:
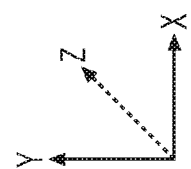
Figure 4B:
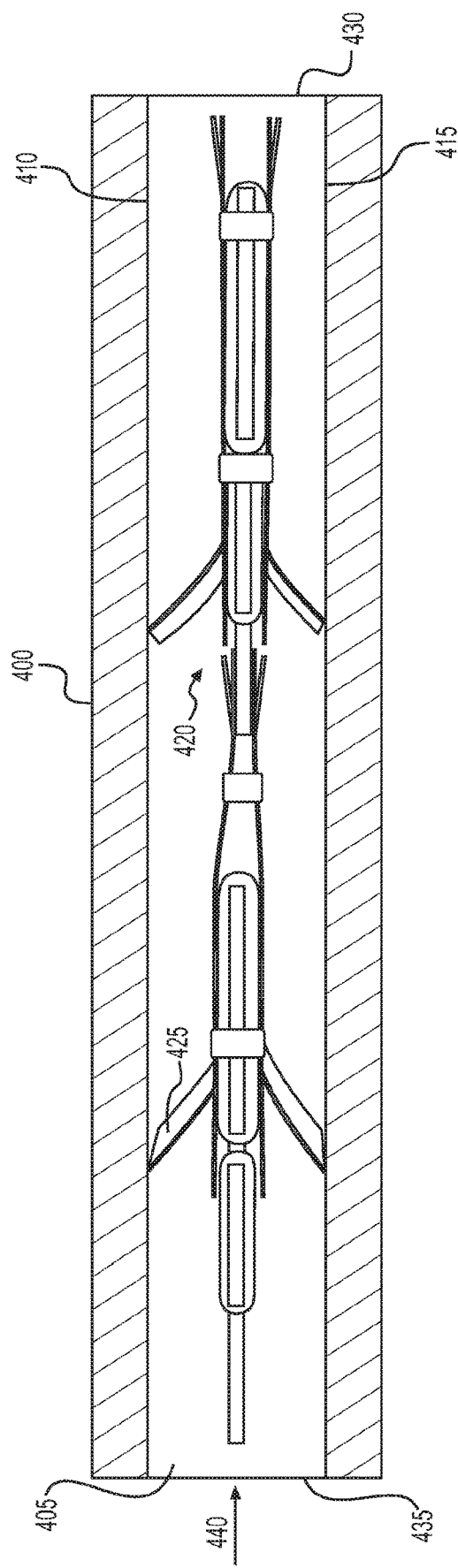
FIG. 4B is a side view of a series of two cells of the disclosure disposed within the tube shown in FIG. 4A.

FIGS. 4A and 4B illustrate housing 400 in the form of a cylindrical tube and comprising a channel 405 extending from one end of the tube (inlet end 435 shown in FIG. 4B) to the other (outlet end 430 shown in FIG. 4B) and having top and bottom inner surfaces of the housing 410 and 415, respectively. A series of cells 420 is disposed within the channel of the housing.

A method of the disclosure provides flowing a single electrolyte solution through the channel extending through the housing, thereby directing the flow of electrolyte from one end of the series of cells to the other end of the series along its length. For example, electrolyte may flow in the direction indicated by 440 from inlet end 435 of the apparatus to outlet end 430. In some embodiments, at least a portion of each cell in the series, such as flaps 425 formed from the cathode current collector, contacts the channel walls defined by inner surfaces of the housing as shown in FIG. 4B. Such contact may restrict or limit flow of electrolyte around the cells and assist in directing electrolyte flow into the conduits between the cathode current collectors and anodes of the cells. The flaps 425 of cathode current collector in the series of cells can be bent outside of the channel at a greater angle such that the angle is reduced when inserted into the channel, thus ensuring contact between the flaps 425 and inner channel walls 410 and 415 of the housing.

In some embodiments, at least a portion of the electrolyte may not pass through each cell in the series. For example, at least a portion of electrolyte may flow through any gaps formed between the series of cells and the inner walls of the housing in which the series of cells is disposed. Some portion of electrolyte may also flow through gaps between cells in the series or through gaps in the cells themselves. Such gaps may potentially provide a path for hydrogen gas to flow if formed during operation of the apparatus. The gaps may also be exploited to provide for control of pressure drop over the length of the apparatus.

In other embodiments, a conduit in one or more or all cells in a series of the disclosure extends transverse to the cell or cells in a direction across the cell widths. For example, conduits 170 in FIG. 1A extend in the z-direction (extending into the plane of the figure). Electrolyte can likewise flow through such conduits 170 between the anodes and cathode current collectors (both above and below the plane of the anode) at least partially or completely in a direction transverse to the cells.

A fixture, referred to herein as a "caddy" could house such a series of cells by providing built-in spacers as well as other inserts and features configured to hold the anodes and cathode current collectors in place as they are exposed to the flow of electrolyte. A caddy could simplify replacement of the anode material by allowing the swapping of new pieces of anode with spent material without disturbing other components of the cells. Such a caddy could be made, for example, using 3D printing techniques and may be formed of plastic. The caddy could be formed as a unitary body or may comprise two or more pieces connected together.

Figure 5A:
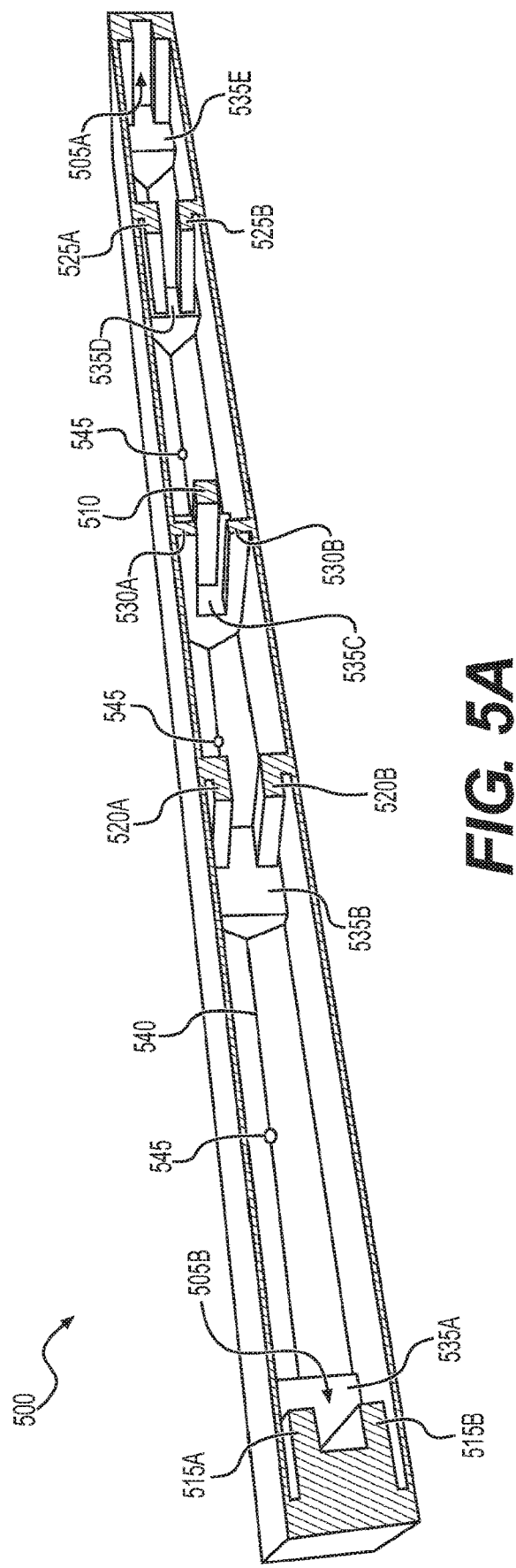
FIG. 5A is a perspective view of a caddy designed to hold a series of two cells of the disclosure.

FIG. 5A provides a perspective view of an exemplary caddy 500 designed to hold a series of two cells of the disclosure. One end of an anode sheet may be placed in notch 505A, with the other end of the anode sheet abutting column 510. The end of a second planar anode may be placed into notch 505B, with the other end abutting the opposite side of column 510. Structures 515A&B, 520A&B and 525A&B form slots together with the outer caddy wall within which to place sheets of current collector and to maintain a distance between sheets of cathode current collector and anode within each individual cell. Protrusions 530A&B would force cathode current collector sheets positioned with one end at 525A&B to bend inward and physically contact an anode of the adjacent cell that would be inserted at notch 505B and abutting column 510. The bottom of the caddy 540 is V-shaped. Structures 535A, 535B, 535C, 535D and 535E provide flat bottom supports on which to rest the anodes and cathode current collectors, above the V-shaped bottom of the caddy. Electrolyte that flows into and through the caddy, in the positive z-direction illustrated in the coordinates of FIG. 5B, may exit the bottom of the caddy through holes 545 shown in FIG. 5A.

Figure 5B:
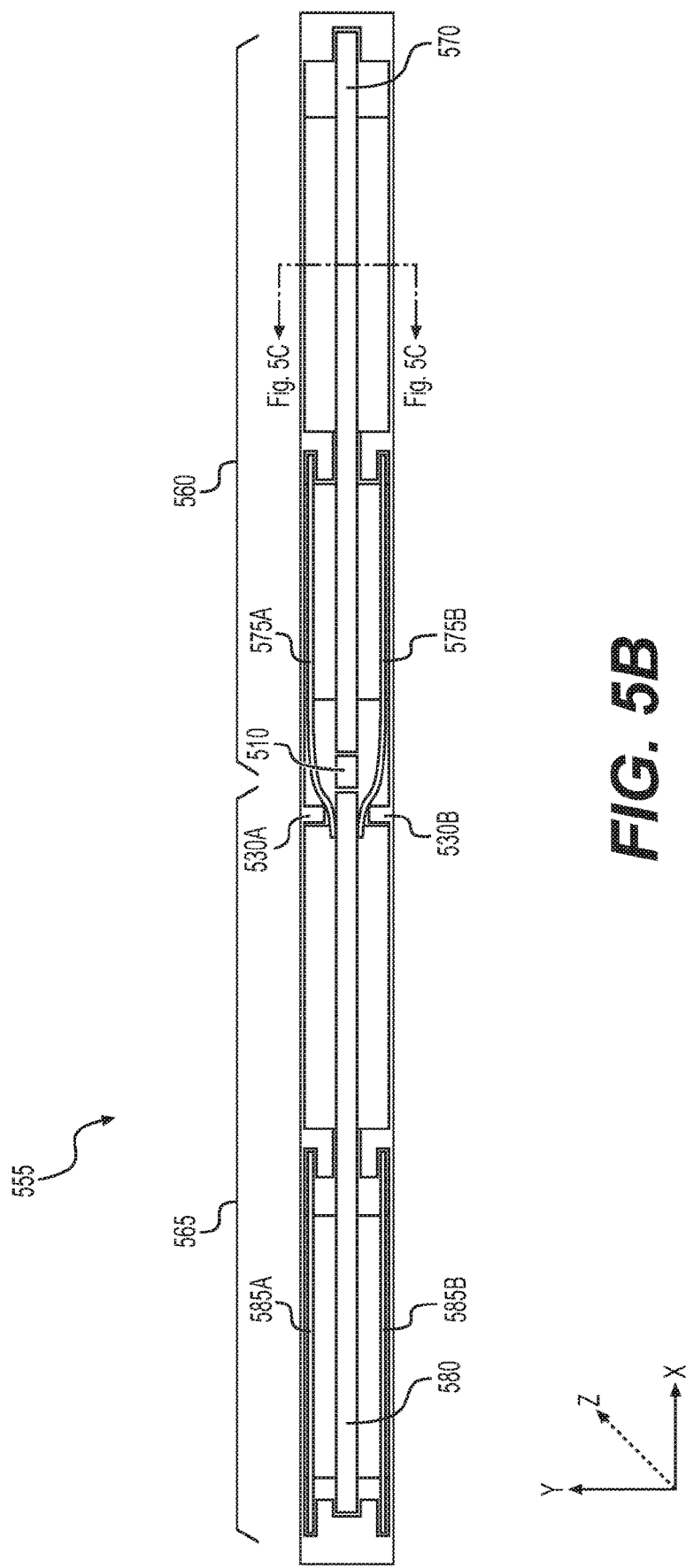
FIG. 5B is a top view of the caddy shown in FIG. 5A, also showing a series of two cells of the disclosure disposed in the caddy.

FIG. 5B is a top view of the caddy of FIG. 5A, with the anodes and cathode current collectors of two cells in series inserted into the caddy. The caddy with inserted components (together 555) includes cells 565 and 560. Cell 560 includes anode 570 with one side inserted into a notch (corresponding to 505A in FIG. 5A) and the other end abutting column 510. Cathode current collector pieces 575A and 575B are inserted into slots at one end and bent around protrusions 530 A&B to contact the anode 580 of the adjacent cell. Anode 580 abuts against the opposite side of column 510 and its other end is placed in a notch at the left side of the cell (corresponding to 505B in FIG. 5A). Cathode current collector 585A and 585B is placed in slots on opposing sides of anode 580. Electrolyte can flow, for example, in the positive z-direction.

FIG. 5C is a sectional view of the caddy of FIG. 5B. The figure illustrates anode 570 of one cell resting above the V-shaped floor of the caddy and hole 545 to accommodate flow of electrolyte out of the caddy. The perimeter walls 590 of the caddy may extend, for example, up to (as in this illustration) or higher than the top of the anode.

Thus, a further embodiment of the disclosure includes a device comprising: connected perimeter walls sharing a common floor and defining an interior volume therebetween; at least two cell containment regions arranged in series within the interior volume, each cell containment region adapted to contain at least two planar materials positioned at a distance from each other; and means for physically contacting a planar material disposed in one region with a planar material disposed in an adjacent region in the series.

The caddy of FIGS. 5A-5C, for example, comprises four connected perimeter walls 590 and common floor 540. It comprises two cell containment regions disposed on either side of column 510, each configured to contain three planar materials, including anode 580 positioned at a distance from cathode current collector 585A&B in cell 565 and anode 570 positioned at a distance from cathode current collector 575A&B in cell 560. Structures 515A&B, 520A&B and 525A&B form spacers between the anodes and cathode current collectors within each cell. Protrusions 530A and 530B provide a means for physically contacting cathode current collector 575A&B to anode 580 of the adjacent cell by bending the current collector. The term "planar material" includes such a planar material that has been physically altered in a portion of the material in order to physically contact the other material. Additional or alternative means for physically contacting the materials include, for example, springs and other forms of compression or tension to bend or otherwise configure the sheets so that they are in physical contact.

A further method of the disclosure includes placing a single electrolyte solution into the interior volume of the device. The cell containment regions are not partitioned and, as a result, the cells (and components within each cell) disposed in the device share the same bulk electrolyte. The device can also accommodate use of the contained cells as flow cells, with electrolyte flowing in a direction from the interior volume of the device to holes 545 at the bottom of the device floor. Such a flow may be in a direction transverse to the cells, such as between the anodes and cathode current collector of the cells when the planar components are positioned with their opposing surfaces parallel to the perimeter walls of the device as shown in FIG. 5B.

A battery pack may comprise any number of caddies comprising a series of cells of the disclosure. For example, a battery pack could comprise 10, 20, 30, 40 or 50 or more caddies, with each caddy comprising a series of cells of the disclosure. A series of cells in one caddy may be connected in series or parallel with another series of cells in a separate caddy, such as with a wire from a cathode current collector of one series connecting to an anode of another series. The collection of caddies could also share a common fluid manifold intake and outlet, meaning that a single common electrolyte fluid could flow into each caddy from one source.

In other embodiments, the electrolyte solution may flow at least partially or completely in a direction normal to the plane of the cathode current collector and/or anode, such as when those components are in the form of sheets. This direction of flow may be possible, for example, when the cathode current collector and/or anode are porous to the electrolyte solution.

Embodiments discussed above disclose many ways to contact the series of cells with a flow of electrolyte solution. Flow rates of electrolyte may be expressed in units of ml/s. When taking into account the geometry of the series of cells, flow speed could also be expressed in units of cm/s. Adjustments to electrolyte flow can tailor the energy output of the cells and optimize, power, efficiency or other design goal.

Accordingly, another embodiment of the disclosure includes a method that comprises providing a series of cells of the disclosure, contacting the series of cells with a single electrolyte solution at a first flow rate, then changing the flow rate to contact the series of cells with the single electrolyte solution at a second flow rate. The change in flow rate may be an increase or a decrease in flow rate. This method may be practiced by changing the flow rate without interrupting a continuous flow of electrolyte to the cells. The method can be practiced by changing the flow rate (either higher or lower) numerous times over any period of time. These flow rates may be changed, for example, in an effort to find an optimal flow rate that maximizes a design goal such as power or efficiency of a battery. Such a method can include measuring the power output or efficiency of the cells at the first flow rate, and measuring the power output or efficiency of the cells at the second flow rate. One or more additional changes to the flow rate can also be made to reach an optimum power output or efficiency of the cells.

Examples of flow speeds of the disclosure include 0.01 cm/s to 10 cm/s, 0.1 cm/s to 1 cm/s, 0.2 to 0.5 cm/s, and 0.3 to 0.5 cm/s, with potential average flow speeds of 0.01, 0.05, 0.10, 0.15, 0.20, 0.25, 0.30, 0.35, 0.40, 0.45, 0.50, 0.55, 0.60, 0.65, 0.70, 0.75, 0.80, 0.85, 0.90, 0.95, 1.50, 2.00, 2.50, 3.00, 3.50, 4.00, 4.50, 5.00, 5.50, 6.00, 6.50, 7.00, 7.50, 8.00, 8.50, 9.00, 9.50, or 10.0 cm/s average flow speed. A certain embodiment may use 0.45 cm/s average flow speed.

The composition of the single electrolyte solution for any embodiments of the series of cells of the disclosure may be chosen from a variety of components. The electrolyte solution comprises a polar solvent. Table 1 lists non-limiting examples of polar solvents for use in the electrolyte solution:

TABLE 1

| Polar Solvents | |
|---|---|
| Solvent | Dielectric constant |
| Water | 80 |
| Sulfuric acid | 101 |
| Ammonia | 26.7 |
| Ethanol | 24.3 |
| Acetonitrile | 36.2 |
| Pyridine | 12.3 |
| Methanol | 30 |
| Glycerol | 47 |
| Ethylene glycol | 37 |
| Hydrofluoric acid | 134 |
| Furfural | 42 |
| Hydrazine | 52 |
| Formamide | 84 |
| Hydrocyanic acid | 158 |

In some embodiments, the electrolyte solution comprises water, one or more alcohols (such as methanol and ethanol), or both water and one or more alcohols as the polar solvent. In other embodiments, the electrolyte solution consists only of water, only of one or more alcohols, or only of a mixture of water and one or more alcohols as the polar solvent. In further embodiments, the electrolyte solution comprises a mixture of water with one or more other polar solvents, including one or more other polar solvents listed in Table 1. The polar solvent may also consist only of water and one or more polar solvents listed in Table 1.

The electrolyte solution also comprises an oxidant to be reduced in the electrochemical cells as the material of the anode is oxidized. A non-limiting list of compounds in Table 2, or their corresponding salts and acids as the case may be, could be delivered as oxidants and/or dissociate in the polar solvent to form oxidants.

TABLE 2

| Oxidants |
|---|
| Peroxydisulfuric acid |
| Sodium peroxydisulfate |
| Peroxymonosulfuric acid |
| Chlorite, chlorate, perchlorate, and other analogous halogen compounds |
| Hypochlorite and other hypohalite compounds, including NaClO |
| Hexavalent chromium compounds such as chromic and dichromic acids and chromium trioxide, pyridinium chlorochromate (PCC), and chromate/dichromate compounds |
| Permanganate compounds such as potassium permanganate |
| Sodium perborate |
| Sodium bismuthate |

As used herein, the term "oxidant" refers to a compound added to perform oxidation as well as the resulting anion that results from dissociation of that compound. Thus, peroxydisulfuric acid ($H_2S_2O_8$), sodium peroxydisulfate ($Na_2S_2O_8$) and the peroxydisulfate anion ($S_2O_8^{2-}$) are all oxidants as used herein. When the acid or salt form of the peroxydisulfate oxidant, for example, is added to an electrolyte solution of the disclosure, there will be dissociation into the anion form. The anion form is the form which acts to oxidize another species and which in turn is reduced. Exemplary concentrations of oxidants in the solution include, for example, from 0.25M to 1M, from 0.5M to 1M, from 0.75 to 1M and from 0.5M to 0.75M.

In some embodiments, the electrolyte solution comprises sodium peroxydisulfate(aq), peroxydisulfuric acid(aq), peroxydisulfate anion ($S_2O_8^{2-}$), or combinations of these. In further embodiments, the electrolyte solution comprises sodium peroxydisulfate(aq), peroxydisulfuric acid(aq), or peroxydisulfate anion ($S_2O_8^{2-}$) in combination with any other oxidant, such as in combination with any other oxidants listed in Table 2 or their respective salts or acids. For example, the electrolyte solution may comprise sodium peroxydisulfate(aq) and sodium hypochlorite(aq).

The oxidant can be, for example, in the form of a salt or an acid. Sodium peroxydisulfate is an oxidant and also a salt. Peroxydisulfuric acid is an oxidant and also an acid. Alternatively, if the oxidant is not a salt or an acid, an appropriate salt (such as a metal salt) or acid can be added to the solution with the oxidant to provide components to form an electrolyte solution. In some embodiments, the oxidant is a salt and a second salt is added to or formed in the solution with the oxidant, thereby resulting in the electrolyte solution comprising two salts.

Exemplary salts, such as metal salts, that can be present in the electrolyte solution in addition to an oxidant, are listed in Table 3. All references to "salts" include compounds such as those in Table 3 as well as the dissociated forms of the compounds when in solution.

TABLE 3

| Metal Salts | | | | | | | |
|---|---|---|---|---|---|---|---|
| KI | NaI | LiI | $BaI_2$ | $CaI_2$ | $MgI_2$ | $ZnI_2$ | $AlI_3$ |
| KBr | NaBr | LiBr | $BaBr_2$ | $CaBr_2$ | $MgBr_2$ | $ZnBr_2$ | $AlBr_3$ |
| KCl | NaCl | LiCl | $BaCl_2$ | $CaCl_2$ | $MgCl_2$ | $ZnCl_2$ | $AlCl_3$ |
| $K_2SO_4$ | $Na_2SO_4$ | $Li_2SO_4$ | $BaSO_4$ | $CaSO_4$ | $MgSO_4$ | $ZnSO_4$ | $Al_2(SO_4)_3$ |
| $KNO_3$ | $NaNO_3$ | $LiNO_3$ | $Ba(NO_3)_2$ | $Ca(NO_3)_2$ | $Mg(NO_3)_2$ | $Zn(NO_3)_2$ | $Al(NO_3)_3$ |
| KF | NaF | LiF | $BaF_2$ | $CaF_2$ | $MgF_2$ | $ZnF_2$ | $AlF_3$ |
| $K_3PO_4$ | $Na_3PO_4$ | $Li_3PO_4$ | $Ba_3(PO_4)_2$ | $Ca_3(PO_4)_2$ | $Mg_3(PO_4)_2$ | $Zn_3(PO_4)_2$ | $AlPO_4$ |
| $K_2SO_3$ | $Na_2SO_3$ | $Li_2SO_3$ | $BaSO_3$ | $CaSO_3$ | $MgSO_3$ | $ZnSO_3$ | $Al_2(SO_3)_3$ |
| $K_2CO_3$ | $Na_2CO_3$ | $Li_2CO_3$ | $BaCO_3$ | $CaCO_3$ | $MgCO_3$ | $ZnCO_3$ | $Al_2(CO_3)_3$ |
| $K_2S$ | $Na_2S$ | $Li_2S$ | BaS | CaS | MgS | ZnS | $Al_2S_3$ |
| $K_2SiO_3$ | $Na_2SiO_3$ | $Li_2SiO_3$ | $BaSiO_3$ | $CaSiO_3$ | $MgSiO_3$ | $ZnSiO_3$ | $Al_2(SiO_3)_3$ |
| KOH | NaOH | LiOH | $Ba(OH)_2$ | $Ca(OH)_2$ | $Mg(OH)_2$ | $Zn(OH)_2$ | $Al(OH)_3$ |

The metal salt should be a compound that dissociates in the polar solvent so as to produce a metal ion and corresponding anion. An example of such a metal salt is sodium sulfate, such as at a concentration of 0.5M in the solution. In embodiments where the solution comprises two salts, such as when the oxidant is a salt and the solution comprises an additional salt such as one listed in Table 3, the salts may comprise either the same or different anion components. The salt may be included in the solution before operating the electrochemical device or may be formed by chemical reaction in the solution during operation of the electrochemical device.

In many embodiments, the electrolyte solution further comprises a base such as a strong base. Examples of strong bases include LiOH, RbOH, CsOH, $Sr(OH)_2$, $Ba(OH)_2$, NaOH, KOH, $Ca(OH)_2$, or combinations thereof. One particular example is NaOH, such as at a concentration of 2M to 3M in the solution. In other embodiments, the electrolyte solution comprises one or more acids such as nitric acid or sulfuric acid.

The electrolyte solution may therefore comprise, or consist of, for example, a polar solvent and an oxidant. An example polar solvent is water. An example oxidant is a salt of peroxydisulfate (such as sodium peroxydisulfate). Such a solution may further comprise, or consist of, a salt that is different from the oxidant. An example salt is a salt of a sulfate (such as sodium sulfate). A solution that comprises or consists of a polar solvent and oxidant; or of a polar solvent, oxidant, and salt; may further comprise or consist of a base or an acid. Example bases include sodium hydroxide and potassium hydroxide. Example acids include sulfuric acid and nitric acid.

Illustrative combinations of components in the electrolyte solution include those in the following Table 4. In some embodiments, the numbered electrolyte solution comprises each of the components identified. In other embodiments, the numbered electrolyte solution consists of each of the components identified.

TABLE 4

Exemplary electrolyte solutions

| Solution | Polar solvent | Oxidant | Salt | Base | Acid |
|---|---|---|---|---|---|
| 1 | Water | $Na_2S_2O_8$(aq) | | | |
| 2 | Water + alcohol | $Na_2S_2O_8$(aq) | | | |
| 3 | Water | $Na_2S_2O_8$(aq) | $Na_2SO_4$(aq) | | |
| 4 | Water + alcohol | $Na_2S_2O_8$(aq) | $Na_2SO_4$(aq) | | |
| 5 | Water | $Na_2S_2O_8$(aq) | | NaOH | |
| 6 | Water + alcohol | $Na_2S_2O_8$(aq) | | NaOH | |
| 7 | Water | $Na_2S_2O_8$(aq) | $Na_2SO_4$(aq) | NaOH | |
| 8 | Water + alcohol | $Na_2S_2O_8$(aq) | $Na_2SO_4$(aq) | NaOH | |
| 9 | Water | $Na_2S_2O_8$(aq) | | | $H_2SO_4$ |
| 10 | Water + alcohol | $Na_2S_2O_8$(aq) | | | $H_2SO_4$ |
| 11 | Water | $Na_2S_2O_8$(aq) | $Na_2SO_4$(aq) | | $H_2SO_4$ |
| 12 | Water + alcohol | $Na_2S_2O_8$(aq) | $Na_2SO_4$(aq) | | $H_2SO_4$ |
| 13 | Water | $H_2S_2O_8$(aq) | | | |
| 14 | Water + alcohol | $H_2S_2O_8$(aq) | | | |
| 15 | Water | $H_2S_2O_8$(aq) | $Na_2SO_4$(aq) | | |
| 16 | Water + alcohol | $H_2S_2O_8$(aq) | $Na_2SO_4$(aq) | | |
| 17 | Water | $H_2S_2O_8$(aq) | | NaOH | |
| 18 | Water + alcohol | $H_2S_2O_8$(aq) | | NaOH | |
| 19 | Water | $H_2S_2O_8$(aq) | $Na_2SO_4$(aq) | NaOH | |
| 20 | Water + alcohol | $H_2S_2O_8$(aq) | $Na_2SO_4$(aq) | NaOH | |
| 21 | Water | $H_2S_2O_8$(aq) | | | $H_2SO_4$ |
| 22 | Water + alcohol | $H_2S_2O_8$(aq) | | | $H_2SO_4$ |
| 23 | Water | $H_2S_2O_8$(aq) | $Na_2SO_4$(aq) | | $H_2SO_4$ |
| 24 | Water + alcohol | $H_2S_2O_8$(aq) | $Na_2SO_4$(aq) | | $H_2SO_4$ |
| 25 | Water | $S_2O_8^{2-}$ | | | |
| 26 | Water + alcohol | $S_2O_8^{2-}$ | | | |

TABLE 4-continued

Exemplary electrolyte solutions

| Solution | Polar solvent | Oxidant | Salt | Base | Acid |
|---|---|---|---|---|---|
| 27 | Water | $S_2O_8^{2-}$ | $Na_2SO_4$(aq) | | |
| 28 | Water + alcohol | $S_2O_8^{2-}$ | $Na_2SO_4$(aq) | | |
| 29 | Water | $S_2O_8^{2-}$ | | NaOH | |
| 30 | Water + alcohol | $S_2O_8^{2-}$ | | NaOH | |
| 31 | Water | $S_2O_8^{2-}$ | $Na_2SO_4$(aq) | NaOH | |
| 32 | Water + alcohol | $S_2O_8^{2-}$ | $Na_2SO_4$(aq) | NaOH | |
| 33 | Water | $S_2O_8^{2-}$ | | | $H_2SO_4$ |
| 34 | Water + alcohol | $S_2O_8^{2-}$ | | | $H_2SO_4$ |
| 35 | Water | $S_2O_8^{2-}$ | $Na_2SO_4$(aq) | | $H_2SO_4$ |
| 36 | Water + alcohol | $S_2O_8^{2-}$ | $Na_2SO_4$(aq) | | $H_2SO_4$ |

In electrolyte solutions illustrated in Table 4 that comprise an alcohol in the polar solvent, the alcohol may be one or more alcohols and can include, for example, methanol, ethanol or both methanol and ethanol.

Without being bound by theory, the following explanation is believed to explain how some embodiments of the series of cells of the disclosure work. In many embodiments the anode is aluminum, the cathode is a catholyte in contact with a cathode current collector, and the catholyte is an electrolyte comprising water, sodium sulfate, sodium hydroxide, and sodium peroxydisulfate.

Without being bound by theory, in such embodiments, the aluminum is oxidized per equation (A) at the anode and persulfate reduction occurs at the surface of the current collector via equation (B)

$$2Al(s) \rightarrow 2Al^{3+} + 6e^- \quad (A)$$

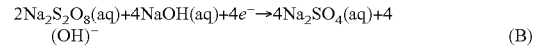

$$2Na_2S_2O_8(aq) + 4NaOH(aq) + 4e^- \rightarrow 4Na_2SO_4(aq) + 4(OH)^- \quad (B)$$

There are, however, two extra electrons available from the oxidation of aluminum. In many embodiments, it is observed that protons are reduced to form hydrogen gas at the aluminum anode. Thus, it is further believed that water dissociates to form $H^+$ and $OH^-$ and then the two extra electrons are available to reduce $H^+$ into hydrogen gas and such hydrogen gas evolution is observed at the aluminum anode and not the current collector where oxidant is reduced. It is also possible that the hydroxide ion itself may be dissociating to form $H^+$ because the same hydrogen evolution is observed when the electrolyte is ethanol.

Accordingly, and as disclosed previously, the electrolyte solution could comprise an alcohol, or, water and an alcohol with one example being ethanol.

In view of the above, the current collector can be characterized as a "cathode current collector," because it distributes electrons that reduce oxidant within the electrolyte solution at the surface of the current collector (according to equation B above), wherein the electrolyte solution can be characterized as a catholyte. The cathode current collector can be, for example, embedded in or otherwise suitably contacting the catholyte, wherein the catholyte is the source of oxidant for reduction at the cathode current collector.

Depending on its materials of construction, the anode (such as one made of aluminum) may possess an oxide layer. Such an oxide layer can be disrupted to enhance the performance of the cells. Without being bound by theory, the following explanation is believed to explain disruption of an oxide layer on an aluminum anode in some embodiments of the disclosure.

Aluminum oxide typically forms in very thin layers on the outside of aluminum, and essentially acts as a barrier to prevent corrosion of the metal. The oxide layer can be disrupted so as to allow the underlying aluminum metal to take part in the electrochemical reaction. The oxide layer may be disrupted in several different ways, such as by exposing it to either a basic or acidic environment, contacting it with a salt, mechanical disruption (such as scratching or bending), or electrical disruption.

One way to disrupt the oxide layer is to include a base such as NaOH in the electrolyte solution. In a classic equation Al+NaOH+$H_2O \rightarrow$NaAl(OH)$_4$+$H_2$, the NaOH first disrupts the oxide layer and then attacks the Al along with water to produce hydrogen gas. When the NaOH attacks the aluminum oxide, it does so indiscriminately and creates small holes in the oxide layer. The holes in the oxide layer allow small molecules such as water to attack the bare aluminum metal to produce hydrogen gas. When $Na_2S_2O_8$ is added to the water, it dissociates into $2Na^+$ and $S_2O_8^{2-}$. $S_2O_8^{2-}$ is a relatively large molecule compared to $H_2O$ and may not fit into the relatively small holes in the aluminum oxide layer. The $S_2O_8^{2-}$ molecule may therefore be sterically hindered from directly exploiting the hole in the oxide layer. When an electrical load is applied to the system, the $S_2O_8^{2-}$ ion is reduced on the cathode current collector. Electrons from the aluminum anode are sent through the load to the cathode current collector, where the $S_2O_8^{2-}$ ion is reduced into two $SO_4^{2-}$ ions.

To produce an acidic environment, NaOH could be substituted with $H_2SO_4$ to achieve a similar effect. A salt, such as NaCl, could also disrupt the oxide layer of aluminum which is common knowledge in the maritime community since aluminum corrodes with seawater. The $Cl^-$ ion is an aggressive ion that can attack and break down the oxide layer over time. The aluminum oxide layer could also be disrupted mechanically, such as by scratching or bending the metal. The oxide layer could alternatively be destroyed electrically.

Also without being bound by theory, aluminum can exist in the non-negative oxidation states +3, +2, +1 and 0, but only the +3 and 0 states are energetically stable under standard battery operating conditions, with the 0 state being the solid aluminum phase. When a strong oxidant such as $S_2O_8^{2-}$ or $2H^+$ reacts with an aluminum atom in the 0 state, it strips 2 electrons from the solid aluminum atom (reducing itself to $2SO_4^{2-}$) while trying to put the aluminum atom into the energetically unstable +2 oxidation state. Because this state is energetically unfavorable, the aluminum atom sheds a third electron to put it in the stable +3 state. The third electron is conducted through the solid aluminum to the load and subsequently to the current collector, wherein the catholyte reduces another $S_2O_8^{2-}$ anion.

By comparison, Zn can exist in the non-negative oxidation states +2, +1 and 0, but only the 0 and +2 states are energetically favored. Thus when the $S_2O_8^{2-}$ anion reacts with a zinc atom in the 0 oxidation state it strips two electrons from the zinc atom putting it in the stable +2 state, and no current is generated. However, if there is an oxidant in the −1 state which is capable of striping a single electron from the zinc, then as in the aluminum case, a current can be generated.

In such single-electrolyte systems, pairs of oxidants and reductants may be selected such that the oxidant removes sufficient electrons to create an unstable oxidation state in the reductant which may spontaneously transition to a stable oxidation state with the release of one or more additional electrons. In such pairs, the unstable oxidation state is a lower oxidation state than the stable oxidation state. The stable oxidation state may have an oxidation state that is +1 or +2 or more compared with the unstable oxidation state. In aluminum, for example, the stable oxidation state, +3 is one more (+1) than the unstable oxidation state.

Multiple series of cells of the disclosure may be configured in series or parallel to each other to form arrangements, for example, of two, three, four or more rows of cells in series and/or parallel to each other. Batteries comprising the series of the disclosure, or multiple series of cells arranged in series and/or parallel also form additional embodiments of the disclosure. A series of cells of the disclosure may connect in series or parallel with any other series of cells like traditional batteries. A metal conductor, such as in the form of a wire (such as copper wire) from the cathode current collector of one series could connect to the anode of another series to put the one series in parallel with the other. Wires may also connect two anodes and two cathode current collectors together to put one series in parallel with the other.

An additional embodiment of the disclosure therefore includes an assembly of connected cells comprising a first series of cells of the disclosure connected in parallel to a second series of cells of the disclosure. A further embodiment includes an assembly of connected cells comprising a first series of cells of the disclosure connected in series to a second series of cells of the disclosure. A yet further embodiment of the disclosure includes an assembly of connected cells comprising a first series of cells of the disclosure connected in series to a second series of cells of the disclosure, where the first series is also connected in parallel to a third series of cells of the disclosure. A series of cells in an assembly may contain the same number of cells or a different number of cells compared to any other series of cells in the assembly. In some embodiments, each series of cells in an assembly comprises, independently, 2, 3, 4, 5, 6, 7, 8, 9, 10, 11, 12, 13, 14, 15, 16, 17, 18, 19, 20, 25, 30, 35, 40, 45 or 50 or more cells. In certain embodiments, each series of cells in an assembly comprises 9 cells.

A series of cells of the disclosure, either alone or in an assembly of more than one series of cells, may be incorporated into a battery. The terms "battery" and "batteries" when used to describe embodiments of the disclosure can include a series of electrochemical cells or multiple series of electrochemical cells contacted with the electrolyte solution. The terms "battery and "batteries" can also include a device that comprises one or more additional components, such as associated wiring, a housing or cover that encloses the series of cells and electrolyte, and any other structural components such as terminals and plugs associated with the device, including components added for convenient and safe use of the device by an end user.

When contacted with a single electrolyte solution and connected to a load, the series of cells or battery of the disclosure can produce hydrogen or both electricity and hydrogen. The load could be the resistance in a wire or it could be to an application, or both. Embodiments of the disclosure further include methods of delivering hydrogen, or both electricity and hydrogen, produced by the series of cells or batteries of the disclosure to an application.

The electrochemical cells may be configured such that electricity is primarily delivered, hydrogen is primarily delivered, or both are delivered in various ratios. Variables that can affect the ratio of electricity to hydrogen production include, for example, the number of cells in the series configuration in the single electrolyte solution, the pH of the electrolyte solution, the surface area of the anode and the amount of oxidant (e.g. molarity) in the electrolyte solution. For example, in Table 5 of Example 1 it is observed that the wattage/cell goes up with the number of cells in series. The open cell voltage/cell remains unchanged as the number of cells increases, but the amperage/cell through the load increases with the number of cells in series leading to higher Wattage. This implies the distribution of electrons released during anode oxidation is being skewed to the oxidant reduction at the cathode current collector over hydrogen production at the anode, as the number of cells is increased.

Hydrogen production may be controlled by adjusting pH and the specific surface area of the anode. Starting with an alkaline solution, as the pH increases and the larger specific surface of the anode used, the more hydrogen is produced. For example, the surface area of the aluminum may be increased by folding over an aluminum screen multiple times. The hydrogen can then be collected at or from each anode in the series of cells. Advantageously, and unlike with hydrogen production from petroleum products, hydrogen may be created without the liberation of $CO_2$ or CO.

Electricity may be favored when oxidant concentration is increased and the solution is made increasingly alkaline. When the pH is neutral, the $S_2O_8^{2-}$ is unable to oxidize the solid aluminum because an $Al_2O_3$ film forms on the solid surface. When the system is very alkaline, such as greater than pH of 12 or even higher, the $OH^-$ anion destroys the aluminum oxide film and allows the $S_2O_8^{2-}$ anion to thereby create a current. By adjusting the pH, either with the addition of OH− ions, such as from NaOH, or by the addition of H+ ions, such as with the addition of sulfuric acid, the availability of OH− and thus control of the current can be regulated. Lower pHs may also work, such as at around 10, provided the surface is sufficiently activated. Current can also be effectively controlled by controlling the bulk velocity of the electrolyte passing through the cell.

The electricity and/or hydrogen can be used in or delivered to many types of applications. Electrical applications include, for example, electrical grid applications such as cell phone towers, cell phone tower backup power, backup power for wind farms or solar farms, battery backup as an alternative to a gas generator, or any other electrical load. The electricity could also be used to power vehicles, electric motors, conventional batteries, household appliances, consumer goods or toys. When configured to run to produce hydrogen, the hydrogen may be delivered to an application such as a fuel cell for electricity production, hydrogen compressors, vehicles, an engine or furnace for burning, or a tank for storage.

The series of cells or electrochemical cells or batteries of the disclosure may be configured to power vehicles (such as electric vehicles or hybrid vehicles). Examples of such vehicles include scooters, motorized grocery cars, forklifts, trucks, passenger cars, golf carts, lift trucks, motorcycles, fork trucks, planes, boats, quads, tractors and other industrial and agricultural vehicles. Hydrogen from the series of cells and batteries of the disclosure can also be delivered to a fuel cell that generates electricity for a motor for vehicle transport. Electricity may also be used to power the fuel cell controller and/or power other vehicle electronics such as an electric motor.

The series of cells or batteries of the disclosure may also be used as combustion assist devices, such as for diesel assist. This would comprise supplying hydrogen produced by the cells to an engine to assist in combustion. The supply of hydrogen increases the temperature in the combustion process and should result in more efficient combustion and less particulates formed in the process. Example 9 illustrates the use of a hydrogen-producing battery for diesel assist.

Further alternative embodiments of the disclosure include additional types of electrochemical cells. These alternative embodiments may optionally be placed in series with each other but could also operate as single cells. If placed in series, the cathode current collector of a cell in the series need not physically contact the anode of another cell in the series. For example, these alternative embodiments may be placed in traditional series arrangements with the use of conductive wires.

A first alternative embodiment of the disclosure includes an electrochemical cell comprising: an anode; a cathode current collector; and a single electrolyte solution in contact with the anode and cathode current collector, wherein the single electrolyte solution comprises an oxidant that is a salt or acid, or comprises an oxidant and a salt. As with other embodiments of the disclosure, the anode and cathode current collector are positioned at a distance from each other to avoid physical contact between the two. As a result, the cell may further comprise a non-conductive spacer between the anode and cathode current collector to maintain a distance between them. The spacer may be porous or non-porous.

A second alternative embodiment additional embodiment of the disclosure includes an electrochemical cell comprising: an anode; a cathode current collector; a single electrolyte solution in contact with the anode and cathode current collector; and a non-porous, non-conductive spacer disposed between the anode and cathode current collector. The anode and cathode current collector are positioned at a distance from each other to avoid physical contact between the two. The spacer disposed between them can be used to maintain that distance. The single electrolyte solution may comprise, for example, an oxidant that is a salt or acid, or may comprise an oxidant and a salt.

In either of these alternative embodiments, the anode and cathode current collector can be partially or completely immersed in their single electrolyte solution. The cells could serve as flow-through cells, accommodating a flow of electrolyte through the cells. A spacer, when present, may form a conduit between the anode and cathode current collector that can be occupied by the electrolyte solution. The disclosure further includes a method which comprises providing a flow of the electrolyte solution between the anode and cathode current collector of the electrochemical cells of either the first or second alternative embodiments. Either embodiment may also be used to produce hydrogen, or both electricity and hydrogen, such as when connected to a load.

The materials of construction and geometries for the anodes, for the cathode current collectors and for the porous or non-porous spacers may all be selected from those described herein for other embodiments of the disclosure. Likewise, the composition of the electrolyte solution, including polar solvents, oxidants, salts, acids, bases and any other components may be chosen from those described herein. The electrolyte solution may therefore comprise, or consist of, for example, water, an alcohol, or both water and an alcohol; a salt of peroxydisulfate (such as sodium peroxydisulfate); an optional additional salt (such as sodium sulfate); a base such as sodium hydroxide or potassium hydroxide; or an acid such as sulfuric acid or nitric acid. The electrolyte solution may also be selected from any of those disclosed in Table 4. Any other attributes or compositions of the alternative embodiments may also be chosen from the analogous attributes or compositions described herein for other embodiments of the disclosure.

Figure 11:
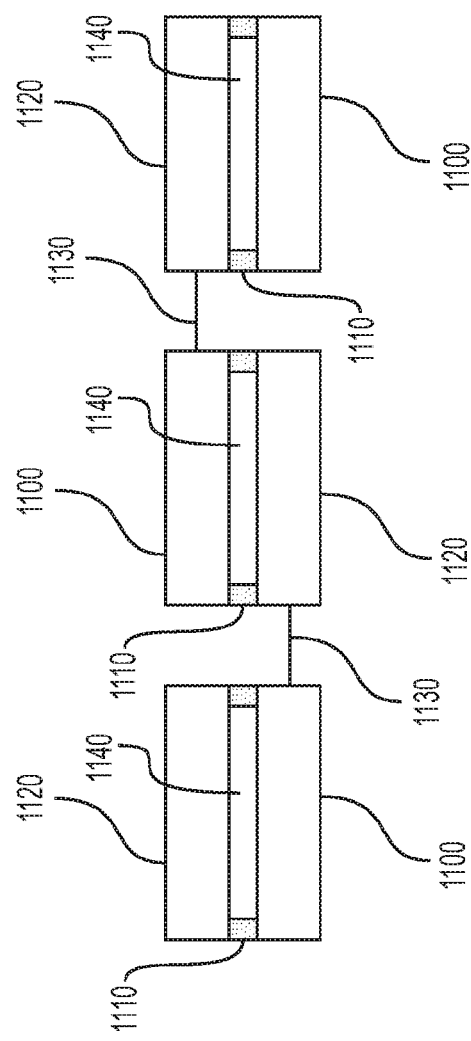
FIG. 11 illustrates three cells of an alternative embodiment of the disclosure connected in series with conductive wire.

FIG. 11 illustrates a series of cells of either the first or second alternative embodiments. In FIG. 11, a series of three electrochemical cells are shown. Each cell contains an anode 1100, such as one comprising aluminum. The anode 1100 is in contact with non-conductive spacers 1110. Cathode current collector 1120, such as one comprising phosphor bronze, is in contact with an opposite surface of non-conductive spacers 1110. A conduit 1140 is provided between the anode 1100 and cathode current collector 1120 of each cell, which could be occupied by an electrolyte solution, such as one comprising sodium peroxydisulfate (aq). If spacers 1110 are porous to electrolyte, the electrolyte may be also disposed in, or flow through, the porous spacers. The stack of anode 1100, current collector 1120 and spacer 1110 may be optionally wrapped in surgical tape or otherwise compressed for physical integrity. Each cell is in electrical contact with an adjacent cell wherein the anode 1100 and the cathode current collector 1120 of adjacent cells are in electrical contact via a conductor, such as with copper wire 1130.

Example 1: N-Series Experiment

Materials used in this experiment include an electrolyte solution that comprises $Na_2S_2O_8$ oxidant, NaOH base, $Na_2SO_4$ salt, and water. The cells used aluminum anodes and phosphor bronze cathode current collectors.

A series of N (1-6 in this experiment) cells configured for transverse flow of electrolyte were placed in the electrolyte fluid with an initial concentration of ½ M $Na_2SO_4$, ¾ M $Na_2S_2O_8$, and 2 M NaOH. The N cells were placed in fluid (3 L N=1, 2, 3; 4 L N=4, 5; 5 L N=6) of the volume of the box the cells are tested in. The boxes were placed on a Sa30 orbital shaker at a speed which moves the fluid appropriately to stimulate fluid flow between the surfaces of the anode and cathode current collector. This fluid flow is relevant as the local concentrations of oxidant and base decrease as electricity and hydrogen are produced and are replenished by the moving fluid.

Voltage was measured across a 1 Ohm resistor, and using Ohm's law (V=IR) current was solved for. Power (W) was then solved using W=V*I. Once the maximum power output of the N-series cell at the specified concentration was achieved, the concentrations were increased by 1M NaOH and ⅓M $Na_2S_2O_8$ which is believed to increase the power output of the cell to the highest attainable level. This generally results in an increased amount of power. This can be seen in FIG. 6.

Figure 6:
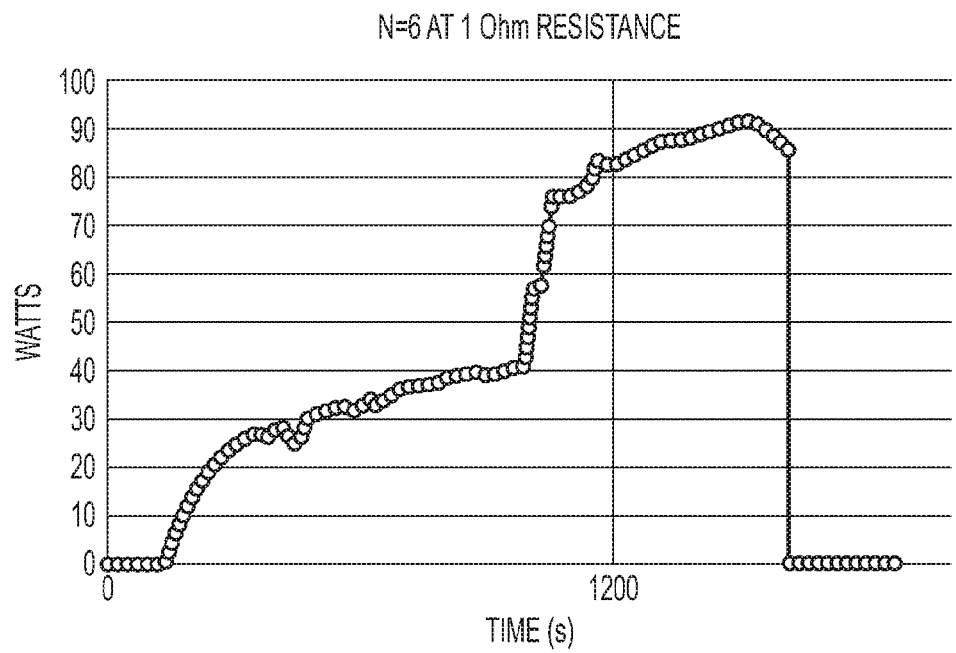
FIG. 6 is a graph of experimental data measured in Example 1 for an embodiment of a series of cells of the disclosure.

The data presented in Table 5 below report results for the experiment, while FIG. 6 reports results where N=6.

TABLE 5

Results of N-series experiment

| N | Total Watts | Watts/Cell |
|---|---|---|
| 1 | 2.9 | 2.9 |
| 2 | 10.4 | 5.2 |
| 3 | 21 | 7 |
| 4 | 37 | 9.25 |
| 5 | 66 | 13.2 |
| 6 | 91.2 | 15.2 |

The experiments were run on a 1 Ohm load. The watts increased when the extra chemicals were added around T=950 seconds. Maximum Watts recorded was 91.2 W and when divided by N=6 means Watts/cell=15.2 W.

Figure 7:
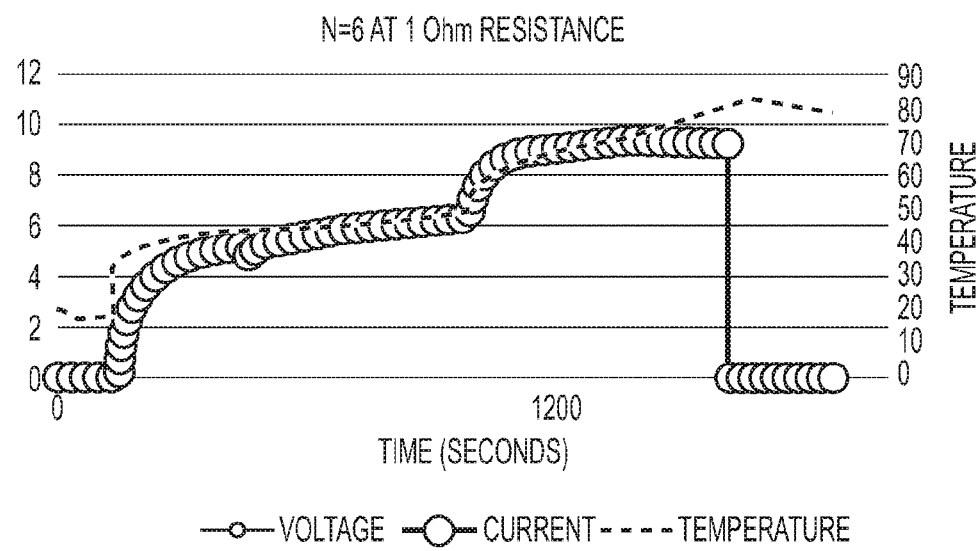
FIG. 7 is a graph of experimental data measured in Example 1 for an embodiment of a series of cells of the disclosure.

FIG. 7 is a second graph from the experiment showing voltage, current (left Y axis), and temperature (right Y axis) over time for the experiment where N=6. Voltage=Current at 1 Ohm, and as a result the two are represented by the same heavy line in the figure.

Example 2: Combined Electricity and Hydrogen Generation in a Single Electrolyte Cell-Based System The single electrolyte cell-based system described in this Example produces hydrogen and electricity simultaneously within a single electrolyte solution. The hydrogen can be captured and used to run a fuel cell that produces electricity or burned at high temperature to increase the efficiency of diesel engines and the like. The electricity that the system produces can be captured directly and used to power an array of electronic systems and electric motors. The cell is the repeating unit of the anode-cathode current collector structure. For this particular implementation of the system, the bulk of the aluminum produces hydrogen (Table 6). The hydrogen generation rate in this implementation is high enough that it can be generated as needed, requiring only low pressure storage of the gas.

TABLE 6

Hydrogen generation from the single electrolyte cell-based system with 1, 2, 4, and 9 cells in series

| Number of Cells | Mass of Al Consumed (g) | Mass of Al Consumed for $H_2$ Production per Hour (g) | Mass of $H_2$ Produced per Hour (g) |
|---|---|---|---|
| 1 | 6.5 | 6.2 | 0.69 |
| 2 | 17.45 | 16.8 | 1.86 |
| 4 | 40.0 | 39.11 | 4.35 |
| 9 | 72.5 | 69.83 | 7.77 |

The portion of the aluminum consumed by the electric aspect of the system is smaller, but generates current effectively (Table 7). Aluminum is not the only metal that can be used. Gallium, indium, and similar metals as well as their various alloys are also suitable. The oxidant used in this implementation was $Na_2S_2O_8$, but other oxidants can also be utilized. The cells in the series were configured for transverse flow of electrolyte. Tuning the chemistry allows one to vary the relative amounts of aluminum consumed by the hydrogen production and electricity generation processes. If all of the aluminum could be directed toward electricity generation, the potential energy densities would be very large (Last Column of Table 7).

TABLE 7

Electricity generation from the single electrolyte cell-based system with 1, 2, 4, and 9 cells in series

| Number of Cells | Mass of Al Consumed (g) | Amp Hours | Mass of Al Used for $Na_2S_2O_8$ Reduction (g) | Mass of $Na_2S_2O_8$ Reduced per Hour (g) | Specific Energy for Electricity Generation Only (Wh/kg) |
|---|---|---|---|---|---|
| 1 | 6.5 | 0.98 | 0.30 | 4.28 | 282 |
| 2 | 17.45 | 1.97 | 0.65 | 8.57 | 549 |
| 4 | 40.0 | 2.81 | 0.89 | 12.78 | 1075** |
| 9 | 72.5 | 5.00 | 1.67 | 21.90 | 1376** |

The results described in Tables 6 and 7 were obtained with initial concentrations of 2 molar NaOH, ¾ molar $Na_2S_2O_8$ and ½ molar $Na_2SO_4$. At the 30 minute time point 1 molar NaOH and ⅓ molar $Na_2S_2O_8$ were added. All experiments were performed at 1 Ohm load, which does not yield the maximum power. Consequently, the specific energies measured here necessarily underestimate the true specific energies.

For this implementation, "n" denotes the number of cells in series that were placed in a single electrolyte bath. Maximum Wattage scales approximately as $W_0(n^{1.8})$, where $W_0$ is the single-cell Wattage. For example, given a single cell Wattage (at the internal resistance of the battery) of approximately 3.2 W, the nine cell system generates a maximum wattage of approximately $3.2*(9^{1.8})=167$ Watts. ** indicates that these experiments were temperature-controlled results (maintained below 65° C.). When the temperature increases past 80° C. the Watts or Watt-hours will likely change substantially.

Example 3: Non-Linear Resistance

The single electrolyte cell-based system is very different from a classical battery—power and energy density are nonlinear functions of the number of cells in series. In a classical battery system, each cell is isolated, possessing its own anode, cathode and electrolyte, and the only motion interior to the cell is diffusion of ions on an electrochemical gradient. In the single electrolyte cell-based system all cells can be immersed in a common electrolyte that is in rapid convective motion relative to the anodes and cathode current collectors. As is illustrated next, this makes the internal resistance a nonlinear function of the number of cells in series, which in turn makes specific energy and power a nonlinear function of the number of cells in series—and provides positive outcomes relative to classical systems.

To demonstrate this effect, an experiment was undertaken to evaluate the internal resistance, defined as the resistance load at which maximum power is obtained. This experiment used flat aluminum bar stock of dimension ⅛" (0.318 cm)×2" (5.08 cm)×4.5" (11.4 cm). Two phosphor bronze sheets of approximate dimension 0.008" (0.020 cm)×2" (5.08 cm)×4.5" (11.4 cm) were used for the cathode current collectors and were placed on opposite sides of the aluminum bars separated from the aluminum by a distance of ⅛" (0.318 cm). The electrolyte (0.5 M $Na_2SO_4$, 0.75 M $Na_2S_2O_8$ and 2.0 M NaOH) was placed in a box of internal width approximately 3.5" (8.89 cm) and of varying length depending upon the number of cells in series. The cells were subsequently placed in the electrolyte on small stands to keep them upright in and arranged series. Subsequently the boxes were set in motion on an orbital shaker. The shaker speed was sufficient to generate substantial flow past the surfaces of the anode and cathode current collector.

Conventional batteries have linear resistance when placed in series. Two conventional battery cells placed in series would yield twice the internal resistance. If the resistance of a single cell is k, then n cells would have a resistance of $kn^1$. The single electrolyte cells described here do not behave like traditional batteries, largely due to the single common fluid design. When cells of the disclosure are placed in series within a single common fluid the internal resistance does not increase linearly as conventional batteries would lead one to expect. In contrast, resistance scales with a power less than one. With a single cell internal resistance, k, a set of n cells in series has an internal resistance of $kn^b$ where b<1 (Table 8).

TABLE 8

Measured Internal Resistance

| Cells | Measured Internal Resistance | Internal Resistance Prediction (Linear Model) | Maximum Power (Watts) | Measured Voltage (V) |
|---|---|---|---|---|
| 0 | 0 | 0 | 0 | 0 |
| 1 | 0.435 | 0.435 | 3.16 | 1.16 |
| 2 | 0.517 | 0.87 | 9.01 | 2.12 |
| 3 | 0.515 | 1.305 | 19.0 | 3.13 |
| 5 | 0.55 | 2.175 | 32.5 | 4.10 |
| 30 | 1.9 | 13.05 | | |

The single electrolyte cell system's measured internal resistance is the point at which maximum power output was observed. The measured internal resistance for a single cell is 0.435 ohms while the internal resistance for a 30 cell system immersed in a common fluid is only 1.9 ohms (Table 8). Maximum power output occurs when the internal resistance is equal to the load resistance.

Figure 8:
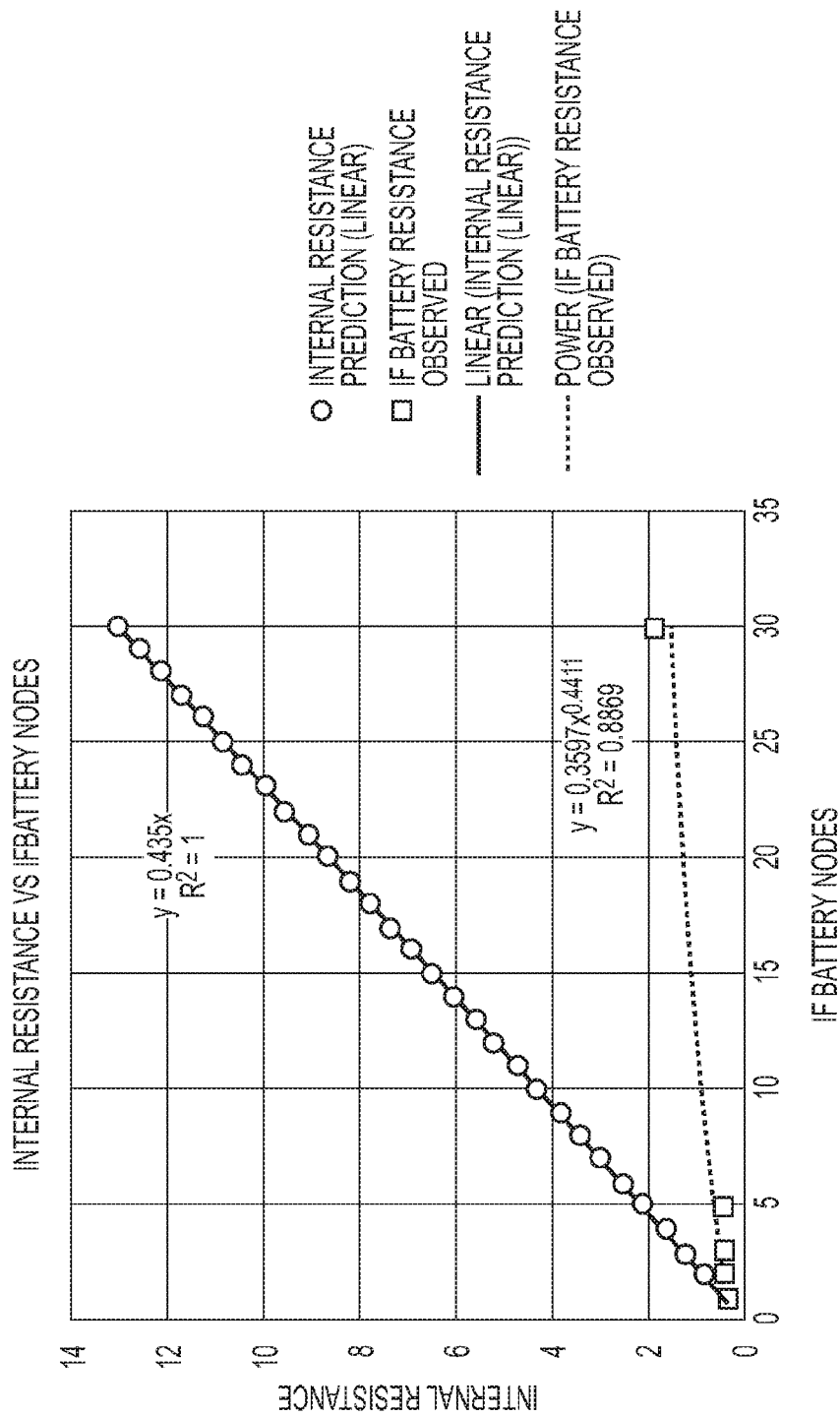
FIG. 8 is a graph of experimental data measured in Example 3 for an embodiment of a series of cells of the disclosure.

FIG. 8 is a graphical representation of the data in Table 8. As illustrated in FIG. 8, the improvement in internal resistance achieved by the system increases dramatically as the number of cells increases. By plotting the predicted (linear) resistance and the measured resistance in the single electrolyte cell system, the difference found is quite distinct. The relationship found for this set of data points is $0.3597*n_{0.4411}$. By having an internal resistance proportional to $kn^b$ where b<1, power the single electrolyte cell system represents a fundamentally distinct advance in energy technology when the cells are submerged in a single common fluid.

$W_n^{max}=V_n^{max}I_n^{max}=nV_1^{max}nV_1^{max}b_n(T)/(n^xR_1^{internal})$ were set so that $W \sim n^{2-x}$. It was assumed that internal resistance is proportional to n and some apriori-unknown power x. As the number of cells in the system increases, so does temperature, requiring a dimensionless function, $b_n(T)$, to account for this variation. Using the above data for the 3- and 5-cell systems it was found that $b_3(54°$ C.$)=0.8$ and $b_5(54°$ C.$)=0.51$, but importantly, $W_n \sim n^{1.84}$ and $n^{1.86}$, respectively, which is quite close to $n^2$. Classical systems have power scaling with n and the power in the single electrolyte cell-based system of this example scales with $n^{1.84}$.

Example 4: Role of Flow Rate

The speed of the fluid in a single-electrolyte cell-based flow battery can be important to the function of the battery. At speeds which are too low, the electrolyte will be locally consumed and the reactions will be diffusion-limited. If the flow speed is too high, then the electrolyte may not have time to react and will not efficiently produce electricity. Increasing the convective flow velocity from zero to some critical number increases power and decreases internal resistance. Beyond this critical value, further increases in convective velocity decreases the power and increases internal resistance. Choosing the correct flow rate, makes it possible to tailor the energy output of the system and optimize power or efficiency or any other particular design goal.

Two experiments demonstrate this result. The first experiment utilized two identical 26 cell single electrolyte cell-based systems configured for transverse flow of electrolyte. The systems were N=2 cells, with 13 (N=2 series of cells) arranged in series. The first was driven at 6.67 ml/s and the second at 10.52 ml/s. Accounting for the geometry of the system, the average speed of the fluid between the electrodes was 0.45 cm/s for case 1 and 0.71 cm/s for case 2.

These speeds were then compared to the electrical output of the systems tested. The lower flow rate produced 104 Watts at concentrations of 2M NaOH, 0.5M $Na_2S_2O_8$, and 0.5M $Na_2SO_4$. The higher flow speed system produced approximately 20 Watts at the same concentrations, which is much less than the low speed system.

The second experiment utilized two different configurations to create flow. The first uses a rectangular acrylic flow cell, open at the top to allow $H_2$ to escape, and mounted on an orbital shaker; the second uses stationary, sealed, clear, PVC tubes with the flow directed vertically upwards and driven by a pump. The latter design produces higher power with a 3-cell system reaching 30 Watts (Table 9). It does so by allowing the user to adjust the flow rate and obtain the optimal power output for a given test and it also minimizes interference in the flow that may be caused by hydrogen gas bubbles forming and disrupting the flow field.

TABLE 9

Electricity generation in a pump-driven tube system - all driven at the flow speed that maximizes power output

| Number of Cells | Wattage | Watts/Cell | Fluid Temperature (° C.) | Output Voltage | Output Current (Amps) | Internal Resistance at Maximum Power (Ohms) |
| --- | --- | --- | --- | --- | --- | --- |
| 1 | 3.28 | 3.28 | 43.0 | 1.38 | 2.37 | 0.581 |
| 2 | 13.0 | 6.5 | 49.0 | 2.77 | 4.7 | 0.590 |
| 3 | 30.0 | 10.0 | 50.2 | 3.73 | 8.0 | 0.466 |

Example 5: Constructing an Apparatus of the Disclosure

This example illustrates the flow of electrolyte along the length of a series of cells of the disclosure from one end of the series to the other end of the series. In this embodiment, the bulk battery fluid flows between an aluminum anode and a phosphor bronze cathode current collector in the cells of the series. Fluid enters the cells via a bent phosphor bronze cathode current collector convergent nozzle, as shown in the form of flaps such as those shown as 345 on cells 305 and 310 in FIG. 3A. The cells are electrically connected in a series of 8 cells according to the disclosure. O-rings are used as non-porous spacers to prevent the anode and cathode current collector in each cell from having physical contact with each other. These O-rings are oriented along the length of the cell, such that they do not block the fluid flow through the cell.

The series of cells was then placed into a channel within a tube in the way illustrated in FIG. 4B. The flaps forming the convergent nozzles are compressed as the series of cells is placed into the tube such that they contact the inner walls of the tube along the channel and focus fluid in between the anodes and cathode current collectors of the series. The fluid channel illustrated is a rectangular tube, but other shapes and designs may also be used. One wire from the positive end of the series and one wire from the negative terminal of the series may then be added to a load to harness electrical energy. Fluid can then be pumped throughout the tube, where the flow is concentrated through the cells between the anodes and cathode current collectors.

Example 6: Convergent Nozzle Experiment

Aluminum anode preparation: Cut a 5" (12.7 cm) length (L) piece of aluminum (in this case an alloy that is commercially available, 6061-T6511) from a 2.5" (6.35 cm) width (W) by 0.125" (0.318 cm) thick (T) bar stock. Cut two notches per side perpendicular to the length, each 0.2" (0.508 cm) deep and 0.235" (0.597 cm) wide at two lateral locations 1.0" (2.54 cm) and 2.25" (5.72 cm) from one end (base or battery negative-pole). Place two O-rings per side, one (size 214 silicone) stretched from the top to the 2.25" (5.72 cm) notch and the other (113 silicone) stretched from the base to the 1" (2.54 cm) notch. These O-rings act as spacers to separate the phosphor-bronze cathode current-collector from the aluminum anode.

Phosphor-bronze cathode current-collector preparation: Cut a 5" (12.7 cm) length (L) from a phosphor-bronze metal sheet 0.008" (0.020 cm) thick (T) by 2.375" (6.03 cm) width (W). Cut two slits into the base (located at 0" (0 cm)) and two slits into the top (located at 5" (12.7 cm), the battery positive pole) each 1.0" (2.54 cm) deep and 0.375" (0.95 cm) from either side. Bend the middle section between the two slits at the base up ½" (1.27 cm) and the middle section at the top up ¼" (0.54 cm). These bent pieces act to funnel the catholyte between the anode and cathode current-collector down the length from the negative pole to the positive pole.

Connecting the current-collector to the anode: Place phosphor-bronze current-collectors on either side of the aluminum anode so that they are in contact with the O-rings, each located 1" (2.54 cm) off-center of the anode (starting at the anode 1" (2.54 cm) notch and extending 1" (2.54 cm) beyond the anode at the opposite end to form the battery positive pole). Wrap a 0.3" (0.76 cm) wide strip of surgical tape 16" (40.6 cm) long around the current-collectors at each of the two creases formed by the bends in the current-collectors. The tape should be tight enough so that when the cell is placed in a rapidly moving catholyte, the anode and cathode current-collectors remain affixed to each other without slippage.

Connecting individual cells in a series according to the disclosure: Label two cells 1 and 2. Slide the anode of cell 2 between the cathode-current collectors of cell 1 to a depth of ½" (1.27 cm), leaving ½" (1.27 cm) of void space between the cells anodes. Compress the 0.375" (0.95 cm) wide current-collectors strips on either side of cell 1 onto the anode of cell 2 and employ two steel ½" (1.27 cm) mini binder clips to affix the cathode current collector of cell 1 to the anode of cell 2. This process can be repeated to an arbitrary number (N) of cells forming N-chains.

Embedding N-chains in a flow cell with common catholyte: Cut off a length of rectangular tube (PVC Hollow Rectangular Bar, Gray, NSF 61, 2¾" (6.99 cm)×1⅜" (3.49 cm), 0.098" (2.49 cm) wall) the same length as the N-chain. Cut off two 2.25" (5.72 cm) pieces of 3.5" (8.89 cm) OD by 3.25" (8.26 cm) ID acrylic pipe and embed end-caps onto the acrylic pipe that fit snuggly to the rectangular tube. The opening of the acrylic pipe is that of the interior of the rectangular tube. Place the acrylic pieces with endcaps onto both ends of the rectangular tubes and hydraulically secure them. The tubes can now be easily attached to common 3" (7.62 cm) plumbing connectors. The N-chain is inserted into this apparatus and the entirety is connected to a pumping system to route the catholyte through the N-chain and dispose of hydrogen gas.

The initial electrolyte solution (catholyte) employed in the experiments was aqueous 3 M NaOH, ¾ M $Na_2S_2O_8$. The pumping rate of electrolyte solution ranged from 0 to 12 gallons (45.2 L) per minute through the tube. The temperature varies depending on length of N-chain. Longer chains generate higher temperatures that can be externally controlled.

Figure 10:
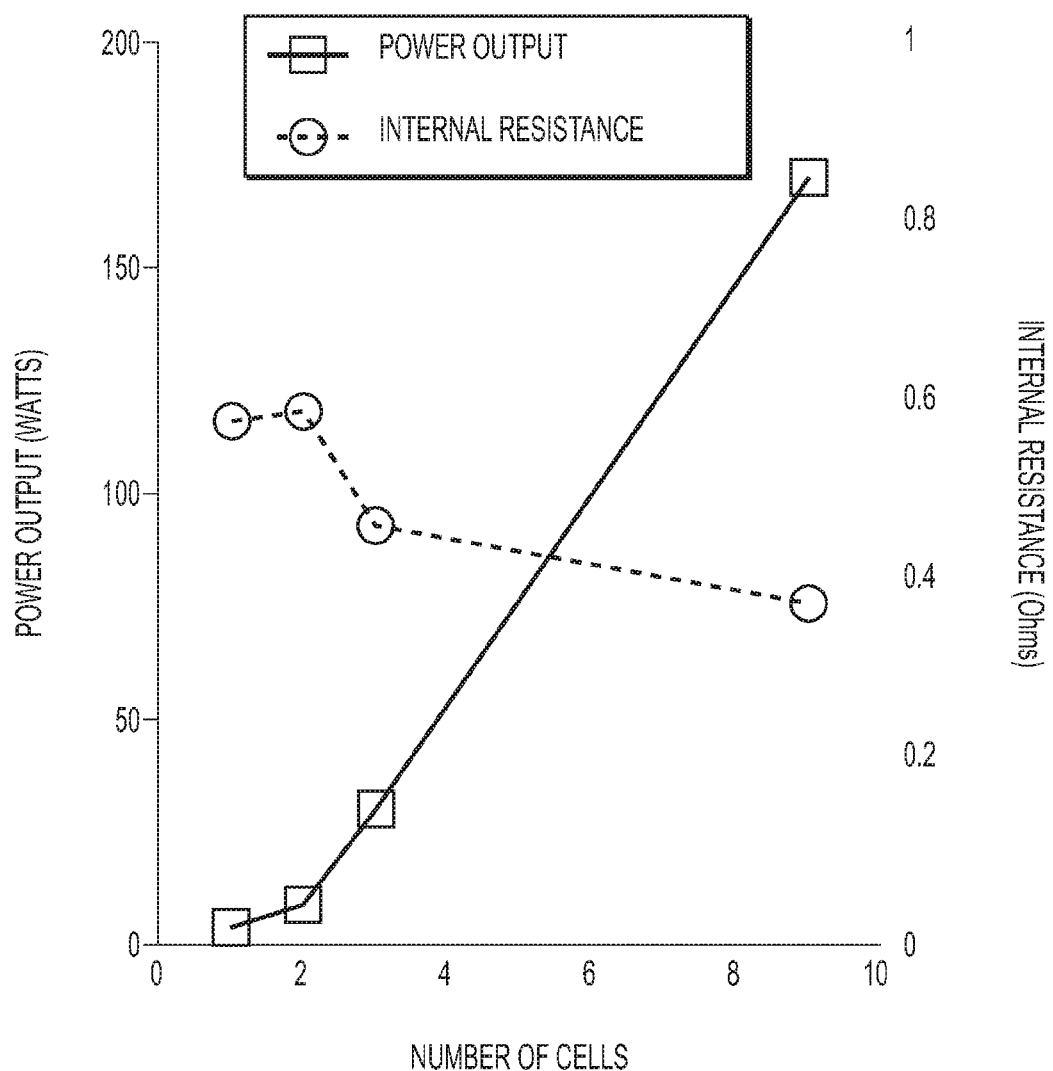
FIG. 10 is a graph of experimental data measured in Example 6 for an embodiment of a series of cells of the disclosure.

Power output and internal resistance in the series were measured for N-chains of 2, 3 and 9 cells in length. The results are shown in FIG. 10. Internal resistance across the series of cells decreased upon the addition of cells, rather than increased as would have been expected.

Example 7: Power Output as a Function of Cell Size and Series Length

A series of cells was made according to the protocol of Example 6. Additional cells were made but either ½ ("½-cells"), ⅓ ("⅓-cells") or ¼ ("¼-cells") the length of the original 5" (12.7 cm) cells ("full-cells"). The ½-cells included an anode and cathode current collector about 2.5" (6.35 cm) in length. The ⅓-cells included an anode and cathode current collector about 1.7" (4.32 cm) in length. The ¼-cells included anode and cathode current collector about 1.25" (3.18 cm) in length.

Various series of N-chains were embedded in a flow cell with a common electrolyte analogously as in Example 6. The initial electrolyte solution (catholyte) employed in the experiments was aqueous 3 M NaOH, ¾ M $Na_2S_2O_8$. The pumping rate of electrolyte solution ranged from 0 to 12 gallons (45.2 L) per minute through the tube. The temperature varies depending on length of N-chain. Longer chains generate higher temperatures that can be externally controlled. The wattage from each series was measured at optimal convective velocity of the electrolyte, i.e., the convective velocity producing the highest wattage. Table 10 reports results of the experiment with the full-cells:

TABLE 10

Wattage measured for full-cells

| Number of full cells in series | Wattage | Watts per full-cell |
|---|---|---|
| 1 | 3.28 | 3.28 |
| 2 | 13.0 | 6.5 |
| 3 | 30.0 | 10 |
| 9 | 170 | 18.8 |

Table 11 reports results of the experiment with ½-cells, ⅓-cells and ¼-cells:

TABLE 11

Wattage measured for ½-cells, ⅓-cells and ¼-cells

| Number of ½-cells in series | Wattage | Watts per ½-cell |
|---|---|---|
| 1 | 2.1 | 2.1 |
| 2 | 13.0 | 6.5 |
| 4 | 29.5 | 7.375 |
| 8 | 75 | 9.375 |
| 17 | 370 | 21.75 |

| Number of ⅓-cells in series | Wattage | Watts per ⅓-cell |
|---|---|---|
| 3 | 20.2 | 6.73 |

| Number of ¼-cells in series | Wattage | Watts per ¼-cell |
|---|---|---|
| 4 | 25 | 6.25 |

The results of the experiment demonstrate that dividing a full-cell into multiple cells of shorter length, and arranging those cells of shorter length in a series, can increase power density for the same fixed mass of metals used. For example, two ½-cells in a series according to the disclosure produces 13 watts compared to 3.28 watts produced by the same mass of metals in a full cell. Analogously, a series of three ⅓-cells or four ¼-cells in series resulted in progressively higher wattage for the same amount of metal used to construct a series.

Example 8: A Battery-Powered Vehicle

Figure 9:
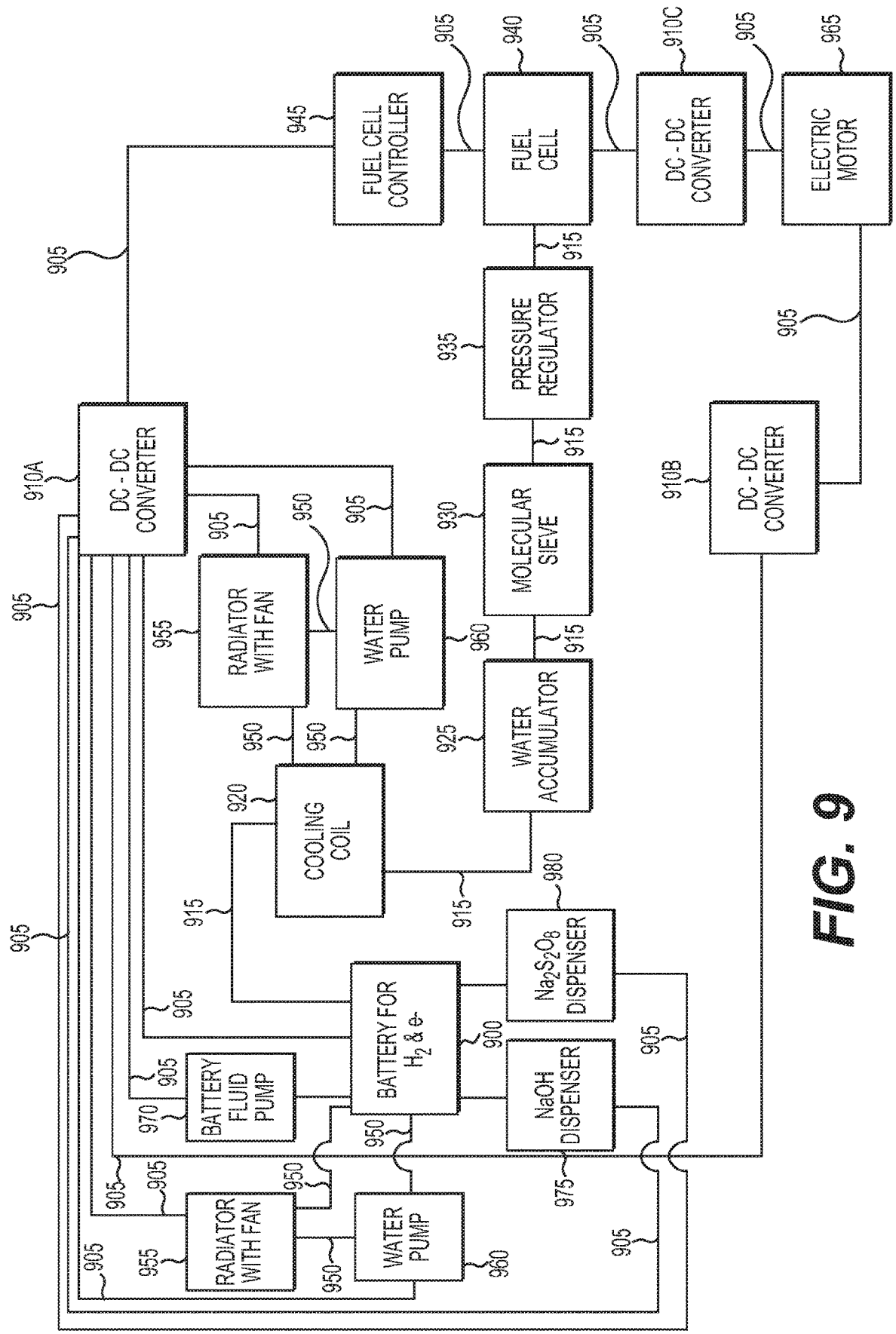
FIG. 9 is a schematic of a vehicle battery system of the disclosure.

A hybrid electric and hydrogen fuel-cell powered vehicle is reconfigured to be powered by a battery of the disclosure. As illustrated in FIG. 9, a battery of the disclosure, 900, is placed in the vehicle and connected via electrical connection 905 to a DC-DC converter 910A, which was electrically connected to fuel cell controller 945. All electrical connections between the provided components are provided as 905. The controller is a small computer which controls the fuel cell cooling system and other components of the fuel cell. One function of the controller is to control the temperature of the fuel cell via a cooling system (not shown) inside 940. The amount of hydrogen let into the fuel cell is controlled by valves connected to or within the fuel cell. The fuel cell controller is in electrical contact with the fuel cell.

Hydrogen from Battery 900 is dried prior to entering fuel cell 940. Here, hydrogen from IFBattery 900 is delivered via hydrogen gas line 915 to cooling coil 920 which is in fluid contact with water pump 960 via water line 950 and radiator/fan 955 via water line 950. Electricity from battery 900 through DC-DC converter 910A may be used to power both the radiator/fan 955 and water pump 960. All hydrogen gas lines between listed components are listed as 915. The cooled hydrogen is transferred via gas line over a water accumulator 925 and through molecular sieve 930 via a gas line and pressure regulator 935 via a gas line for delivery to fuel cell 940 via a gas line.

Fuel cell 940 converts hydrogen to electricity for delivery to DC-DC converter 910C for delivery to electric motor 965 for use in powering the vehicle. Optional DC-DC converter 910B may be used to power electric motor 965 also or in lieu of a fuel cell.

Battery 900 may be positioned within a system as described below. In such as system, bulk battery fluid can be stored at the bottom of a tank, then transported to a fluid manifold via a pump. The fluid can then flow through to one or more series of cells of the disclosure, and then to a fluid outlet where the flow rate is controlled. The fluid may cycle from the battery fluid tank, to the pump, to the fluid manifold, through the cells, to the fluid outlet, and return to the battery fluid tank. This cycle can repeat for as long as the battery is running. In the battery fluid tank, electrolyte components such as NaOH and $Na_2S_2O_8$ can be added to maintain a steady concentration. A radiator may also be added to keep temperature to a specified range, for example within 40-80 C.

Electric wires can all be connected at a central port. A diode may be connected between each series configuration and the central electrical bus. A diode works as a one way valve, ensuring electrons only flow one direction. Hydrogen is released at $H_2$ ports and may go into the hydrogen purification stream on the block diagram.

The block diagram includes a battery fluid pump 970, NaOH dispenser 975, $Na_2S_2O_8$ dispenser 980, and another water pump 960/radiator 955 combination which will maintain the temperature of the battery pack. These can all be powered with the DC-DC converter (910A) which utilizes electrical power from the battery. The NaOH 975 and $Na_2S_2O_8$ 980 dispensers are used to add more of each chemical into the battery fluid tank to either maintain the concentration as the chemicals are used up, or to increase the concentrations. The battery fluid pump takes fluid from the tank to the fluid manifold. The fluid flow is used in the context of a flow battery.

The hybrid electric and hydrogen fuel-cell powered vehicle can be, for example, a golf cart. A battery of the disclosure for use in the golf cart can include anodes of 53.5 g aluminum, or 107 g per 2N series and cathode current collector of 2×7.5 g phosphor bronze, or 30 g per 2N series. A 2N configuration of cells is placed in a box with 12 other 2N configurations of cells in a series configuration. The box includes 2N cells in series, or a 13 series of 2N configuration of cells. The connections between the series cells are made with tin coated copper wire with one end terminating in an alligator clip connecting to the next anode, and the other end terminating in a steel ribbon welded to the two phosphor bronze cathode current collector pieces via an electrical discharge machine. The box of cells is then placed in 4 L bulk fluid of 2M NaOH, 0.5M $Na_2S_2O_8$, and 0.5M $Na_2SO_4$. A second box of cells can be prepared analogously and connected in series with the first box of cells to power the vehicle.

Example 9: Combustion Assist with Hydrogen

A battery generates hydrogen from the reaction of NaOH+ $H_2O$+Al. Hydrogen is controlled by a ball valve that outputs the gas into the intake of a diesel engine. When the hydrogen is mixed with the air, the diesel engine RPM instantly rises above 3600 RPM due to greater energy output during combustion. The governor then decreases the amount of diesel fuel to achieve a desired RPM of 3600 set by the governor. When the ball valve is closed, hydrogen stops flowing into the engine and the engine RPM decreases below 3600 RPM. The governor then increases the amount of diesel fuel injected into the engine to once again return the engine speed to 3600 RPM.

The following clauses form additional embodiments of the disclosure.

Clause 1. A series of cells for use in an electrochemical device, which comprises:
  a first cell comprising an anode and a cathode current collector; and
  a second cell comprising an anode and a cathode current collector;
  wherein the cathode current collector of the first cell is in physical contact with the anode of the second cell.

Clause 2. The series of cells of Clause 1, which comprises N cells, each cell comprising an anode and a cathode current collector, wherein N−1 cells in the series comprise a cathode current collector that is in physical contact with the anode of an adjacent cell in the series, and wherein N is an integer greater than 2.

Clause 3. The series of cells of any one of Clauses 1-2, which comprises 6 or more cells.

Clause 4. The series of cells of Clause 3, which comprises 9 or more cells.

Clause 5. The series of cells of Clause 4, which comprises 12 or more cells.

Clause 6. The series of cells of any one of Clauses 1-5, wherein at least one cell comprises a non-conductive spacer between its anode and cathode current collector.

Clause 7. The series of cells of Clause 6, wherein the non-conductive spacer contacts both the anode and cathode current collector of the cell.

Clause 8. The series of cells of any one of Clauses 1-7, wherein the cathode current collector of at least one cell is in the form a single piece of material.

Clause 9. The series of cells of any one of Clauses 1-7, wherein the cathode current collector of at least one cell is in the form of multiple pieces of material.

Clause 10. The series of cells of Clause 9, which comprises a non-conductive spacer between each of the multiple pieces of cathode current collector and the anode of the at least one cell, and wherein the multiple pieces of cathode current collector material are each in physical contact with the anode of an adjacent cell in the series.

Clause 11. The series of cells of any one of Clauses 1-10, wherein the cells are positioned such that the series is linear from one end of the series to the other end of the series.

Clause 12. The series of cells of any one of Clauses 1-11, wherein at least one cell in the series comprises a conduit between its anode and cathode current collector, wherein the conduit extends from an inlet end to an outlet end.

Clause 13. The series of cells of Clause 12, wherein the conduit in the at least one cell in the series extends in a direction transverse to the cell across the cell width.

Clause 14. The series of cells of Clause 12, wherein the conduit in the at least one cell in the series extends in a direction along the length of the series.

Clause 15. The series of cells of any one of Clauses 1-5, wherein at least one cell in the series comprises a conduit between its anode and cathode current collector, wherein the conduit extends from an inlet end to an outlet end; and wherein the conduit extends in a direction along the length of the series.

Clause 16. The series of cells of Clause 14, wherein the at least one cell comprises a convergent nozzle at the inlet end of the conduit.

Clause 17. The series of cells of Clause 15, wherein the at least one cell comprises a convergent nozzle at the inlet end of the conduit.

Clause 18. The series of cells of Clause 16, wherein the cathode current collector of the at least one cell forms the convergent nozzle.

Clause 19. The series of cells of Clause 17, wherein the cathode current collector of the at least one cell forms the convergent nozzle.

Clause 20. The series of cells of Clause 18, wherein the cathode current collector comprises a bend such that the distance between at least a portion of the cathode current collector and the anode of the cell tapers to reduce the cross-sectional area of the conduit in the direction from the inlet end to the outlet end of the conduit.

Clause 21. The series of cells of any one of Clauses 1-20, wherein at least one anode of the cells in the series comprises at least one of aluminum, gallium, indium, and thallium, or any combination of two or more of these.

Clause 22. The series of cells of any one of Clauses 1-5, wherein at least one anode of the cells in the series comprises at least one of aluminum, gallium, indium, and thallium, or any combination of two or more of these.

Clause 23. The series of cells of any one of Clauses 1-22, wherein at least one cathode current collector of the cells in the series comprises at least one of bronze, phosphor bronze, steel, carbon, the graphite allotrope of carbon, carbon impregnated with a metal, carbon foam, copper, tin, iron, lead, platinum, gold, and silver, or any combination of two or more of these.

Clause 24. The series of cells of any one of Clauses 1-5, wherein at least one cathode current collector of the cells in the series comprises at least one of bronze, phosphor bronze, steel, carbon, the graphite allotrope of carbon, carbon impregnated with a metal, carbon foam, copper, tin, iron, lead, platinum, gold, and silver, or any combination of two or more of these.

Clause 25. The series of cells of any one of Clauses 6-24, wherein the non-conductive spacer of the at least one cell is porous.

Clause 26. The series of cells of Clause 25, wherein the porous and non-conductive spacer of the at least one cell comprises at least one of porous glass, papers, fabrics, cloth, wood, organic polymer, fiberglass film, glass wool, cardboard, and nylon, or any combination of two or more of these.

Clause 27. The series of cells of any one of Clauses 6-24, wherein the non-conductive spacer of the at least one cell is non-porous.

Clause 28. The series of cells of Clause 27, wherein the non-porous and non-conductive spacer of the at least one cell comprises at least one of non-porous plastics, elastomers, organic polymers, gels, rubbers, and O-rings, or any combination of two or more of these.

Clause 29. An electrochemical cell comprising the series of cells of any one of Clauses 1-28, wherein the series is in contact with a single electrolyte solution.

Clause 30. An electrochemical cell comprising the series of cells of any one of Clauses 1-5, wherein the series is in contact with a single electrolyte solution.

Clause 31. The electrochemical cell of Clause 29, wherein the single electrolyte solution comprises a salt or acid of peroxydisulfate and optionally a salt of sulfate.

Clause 32. The electrochemical cell of Clause 30, wherein the single electrolyte solution comprises a salt or acid of peroxydisulfate and optionally a salt of sulfate.

Clause 33. The electrochemical cell of Clause 31, wherein the peroxydisulfate salt is sodium peroxydisulfate and the optional sulfate salt is sodium sulfate.

Clause 34. The electrochemical cell of Clause 32, wherein the peroxydisulfate salt is sodium peroxydisulfate and the optional sulfate salt is sodium sulfate.

Clause 35. The electrochemical cell of any one of Clauses 29-34, wherein the single electrolyte solution comprises a base.

Clause 36. The electrochemical cell of Clause 35, wherein the base is sodium hydroxide.

Clause 37. An apparatus comprising:
a housing comprising at least one channel extending from one outer surface of the housing to an opposing outer surface of the housing; and
a series of cells of any one of Clauses 1-28, or an electrochemical cell of any one of Clauses 29-36, positioned within the at least one channel.

Clause 38. The apparatus of Clause 37, wherein the housing is an elongated body having a circular or rectangular cross-section and the channel extends from one end of the elongated body to the other end of the elongated body.

Clause 39. The apparatus of Clause 38, wherein the cathode current collector of at least one cell is in contact with at least one channel wall defined by an inner surface of the housing.

Clause 40. A device comprising:
connected perimeter walls sharing a common floor and defining an interior volume therebetween;
at least two cell containment regions arranged in series within the interior volume, each cell containment region adapted to contain at least two planar materials positioned at a distance from each other; and
means for physically contacting a planar material disposed in one region with a planar material disposed in an adjacent region in the series.

Clause 41. The device of Clause 40, which comprises a planar anode and a planar cathode current collector disposed in each cell containment region.

Clause 42. The device of Clause 41, wherein the anode and cathode current collector within each region are maintained at a distance by at least one spacer disposed between them.

Clause 43. A battery comprising a series of cells of any one of Clauses 1-28 or an electrochemical cell of any one of Clauses 29-36.

Clause 44. A vehicle comprising a series of cells of any one of Clauses 1-28, or an electrochemical cell of any one of Clauses 29-36, or a battery of Clause 43.

Clause 45. A vehicle of Clause 44, wherein the vehicle is selected from scooters, golf carts, motorized grocery cars, forklifts, trucks, passenger cars, lift trucks, motorcycles, fork trucks, planes, boats, quads, and tractors.

Clause 46. A method comprising:
providing a series of cells of any one of Clauses 1-28; and
contacting the series with a single electrolyte solution.

Clause 47. A method comprising:
providing a series of cells of Clause 12; and
providing a flow of a single electrolyte solution through the conduits of the cells in the series.

Clause 48. The method of Clause 47, wherein the conduit in at least one cell in the series extends in a direction transverse to the cell across the cell width, and wherein the electrolyte is directed to flow transverse to the cell through the conduit.

Clause 49. The method of Clause 47, wherein the conduit in at least one cell in the series extends in a direction along the length of the series, and wherein the electrolyte is directed to flow through the conduit along the length of the series.

Clause 50. The method of Clause 49, wherein the at least one cell comprises a convergent nozzle at the inlet end of the conduit.

Clause 51. The method of Clause 50, wherein the cathode current collector of the at least one cell in the series forms the convergent nozzle.

Clause 52. The method of Clause 51, wherein the cathode current collector comprises a bend such that the distance between at least a portion of the cathode current collector and the anode at the inlet of the conduit tapers to reduce the cross-sectional area of the conduit in the direction from the inlet end to the outlet end of the conduit.

Clause 53. A method for producing electricity, which comprises providing a series of cells of any one of Clauses 1-28 in contact with a single electrolyte solution, or providing an electrochemical cell of any one of Clauses 29-36, or providing a battery of Clause 43, and connecting the series of cells or the electrochemical cell or the battery to a load.

Clause 54. A method for producing hydrogen, which comprises providing a series of cells of any one of Clauses 1-28 and contacting the series with a single electrolyte solution.

Clause 55. A method for producing both electricity and hydrogen, which comprises providing a series of cells of any one of Clauses 1-28 in contact with a single electrolyte solution, or providing an electrochemical cell of any one of Clauses 29-36, or providing a battery of Clause 43, and connecting the series of cells or the electrochemical cell or the battery to a load.

Clause 56. A method comprising:
providing an apparatus of any one of Clauses 37-39; and
providing a flow of a single electrolyte solution through the at least one channel of the apparatus.

Clause 57. A method comprising:
providing a device of any one of Clauses 40-42; and
providing a flow of a single electrolyte solution into the interior volume of the device.

Clause 58. An electrochemical cell comprising:
an anode;
a cathode current collector; and
a single electrolyte solution in contact with the anode and cathode current collector, wherein the single electrolyte solution comprises an oxidant that is a salt or acid, or comprises an oxidant and a salt.

Clause 59. An electrochemical cell comprising:
an anode;
a cathode current collector;
a single electrolyte solution in contact with the anode and cathode current collector; and
a non-porous, non-conductive spacer disposed between the anode and cathode current collector.

While the disclosure has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this disclosure. Accordingly, all such modifications are intended to be included within the scope of this disclosure as defined in the following claims.

I claim:

1. A series of cells for use in an electrochemical device, which comprises:
   a first cell comprising an anode and a cathode current collector; and
   a second cell comprising an anode and a cathode current collector;
   wherein the cathode current collector of the first cell is in physical contact with the anode of the second cell,
   wherein each cell in the series comprises a conduit between its anode and cathode current collector, wherein the conduit of each cell extends from an inlet end to an outlet end in a direction along the length of the series,
   wherein the cells in the series form a chain with the outlet of each upstream cell aligned with the inlet of each adjacent downstream cell such that the conduits of the cells in the series together form a flow path extending from one end of the series and through the series of cells to the other end of the series, and
   wherein at least one cell comprises a convergent nozzle at the inlet end of its conduit,
      wherein the convergent nozzle reduces the cross-sectional area of the conduit of the at least one cell in the direction from the conduit's inlet end to its outlet end, and
      wherein the cathode current collector of the at least one cell is shaped to wholly or partially form the convergent nozzle.

2. The series of cells of claim 1, wherein the cathode current collector of the at least one cell comprising the convergent nozzle comprises a bend such that the distance between at least a portion of the cathode current collector and the anode of the at least one cell comprising the convergent nozzle tapers to reduce the cross-sectional area of the conduit in the direction from the inlet end to the outlet end of the conduit.

3. The series of cells of claim 1, wherein at least one anode of the cells in the series comprises at least one of aluminum, gallium, indium, and thallium, or any combination of two or more of these.

4. The series of cells of claim 1, wherein at least one cathode current collector of the cells in the series comprises at least one of bronze, phosphor bronze, steel, carbon, the graphite allotrope of carbon, carbon impregnated with a metal, carbon foam, copper, tin, iron, lead, platinum, gold, and silver, or any combination of two or more of these.

5. The series of cells of claim 1, wherein at least one cathode current collector of the cells in the series comprises phosphor bronze.

6. An electrochemical cell comprising the series of cells of claim 1, wherein the series is in contact with a single electrolyte solution.

7. The electrochemical cell of claim 6, wherein the single electrolyte solution comprises a salt of peroxydisulfate.

8. The electrochemical cell of claim 7, wherein the peroxydisulfate salt is sodium peroxydisulfate.

9. The electrochemical cell of claim 6, wherein the single electrolyte solution comprises a base.

10. The electrochemical cell of claim 9, wherein the base is sodium hydroxide.

11. A method comprising:

providing a series of cells of claim 1; and providing a flow of a single electrolyte solution through the conduits of the cells from one end of the series to the other end of the series.

12. A method for producing electricity, which comprises providing a series of cells of claim 1 in contact with a single electrolyte solution, and connecting the series of cells to a load.

13. A method for producing hydrogen, which comprises providing a series of cells of claim 1 and contacting the series with a single electrolyte solution.

\* \* \* \* \*